(12) United States Patent
Li et al.

(10) Patent No.: US 9,363,063 B2
(45) Date of Patent: Jun. 7, 2016

(54) PROCESSING UPLINK DATA TRANSMISSIONS IN A HETEROGENEOUS WIRELESS NETWORK

(71) Applicants: ZTE Corporation, Shenzhen (CN); ZTE Wistron Telecom AB, Stockholm (SE)

(72) Inventors: Nan Li, Beijing (CN); Thorsten Schier, Stockholm (SE); Patrick Svedman, Stockholm (SE); Yonghong Gao, Stockholm (SE); Aijun Cao, Stockholm (SE); Jan Johansson, Norrfjärden (SE); Bojidar Hadjiski, Stockholm (SE)

(73) Assignees: ZTE Wistron Telecom AB, Stockholm (SE); ZTE Corporation, Shenzhen (CN)

( * ) Notice: Subject to any disclaimer, the term of this patent is extended or adjusted under 35 U.S.C. 154(b) by 119 days.

(21) Appl. No.: 14/069,243

(22) Filed: Oct. 31, 2013

(65) Prior Publication Data

US 2014/0126553 A1 May 8, 2014

(30) Foreign Application Priority Data

Nov. 2, 2012 (WO) ................ PCT/CN2012/084027

(51) Int. Cl.
*H04W 4/00* (2009.01)
*H04L 5/00* (2006.01)

(52) U.S. Cl.
CPC ............ *H04L 5/0055* (2013.01); *H04L 5/0073* (2013.01)

(58) Field of Classification Search
None
See application file for complete search history.

(56) References Cited

U.S. PATENT DOCUMENTS

2009/0235138 A1\* 9/2009 Chang et al. .................. 714/748

FOREIGN PATENT DOCUMENTS

WO   WO 2012/026854   \*  3/2012

\* cited by examiner

*Primary Examiner* — Frank Duong
(74) *Attorney, Agent, or Firm* — Perkins Coie LLP

(57) ABSTRACT

In a heterogeneous wireless network that includes a macro base station and one or more micro base stations, a wireless device to wirelessly transmit, in a first time slot at a first position in a first transmission subframe, data over a first physical communication channel. An ACK/NACK control message is received over a backhaul network connection a first time period after the first time slot. A response message is transmitted to the wireless device such that when the control message is received prior to the second time slot, then the response message uses data reception information from the control message and when the control message is not received prior to the second time slot, then the response message indicates that the data was successfully received.

15 Claims, 18 Drawing Sheets

PROCESSING UPLINK DATA TRANSMISSIONS IN A HETEROGENEOUS WIRELESS NETWORK

CROSS REFERENCE TO RELATED APPLICATIONS

This patent document claims the benefit of priority from International Patent Application No. PCT/CN2012/084027, filed on Nov. 2, 2012. The entire content of the before-mentioned patent application is incorporated by reference herein.

BACKGROUND

This document relates to cellular telecommunication systems, including heterogeneous networks where one or more low-power nodes are deployed at least partially within the coverage area of a macro base station.

Cellular communication systems are being deployed all over the world to provide voice services, mobile broadband data services and multimedia services. There is a growing need for cellular data bandwidth due to various factors, including the continuous increase in the number of mobile phones such as smartphones that are coming on line and deployment of new mobile applications that consume large amounts of data, e.g., mobile applications in connection with video and graphics. As mobile system operators add new mobile devices to the network, deploy new mobile applications and increase the geographic areas covered by broadband mobile services, there is an ongoing need to cover the operator's coverage area with high bandwidth connectivity.

SUMMARY

The available cellular bandwidth for data communication in a given coverage area, both in the uplink direction (from user equipment to network) and in the downlink direction (from network to user equipment) can be increased by a number of techniques, including improving the spectrum efficiency for the point-to-point link and splitting communication cells into smaller cells. In cell splitting, when the split cells become small and close to one another, the adjacent cell interferences can become significant and may lead to the cell splitting gain saturation as the number of split cells in a given area increases to above a certain number. Furthermore, nowadays it is increasingly difficult to acquire new sites to install base stations and the costs for adding new base stations are increasing. These and other factors render it difficult to use cell-splitting to fulfill the increasing bandwidth demands.

This document describes how a HetNet topology can benefit from uplink bandwidth capacity gain offered by the introduction of low power nodes (LPN). The capacity gain can be achieved even for a mix of user equipment (UEs) following different releases of a wireless standard, a legacy release, in which UEs are unaware of LPNs and do not benefit from new control signals introduced into the network due to the introduction of LPNs, and a newer release in which UEs can benefit from new control channel types introduced into the network with LPNs. Specifically with respect to Long Term Evolution, or LTE, standard, this document discloses how LTE UEs from all 3GPP releases (Rel 8 and forward) can send their data through an uplink data channel, called Physical Uplink Shared Channel (PUSCH), which is received and decoded by the low power nodes. In one aspect, UEs are controlled to reduce uplink transmission power such that a nearby LPN is able to receive the uplink data transmission, but a macro base station for the macrocell need not receive the UE's uplink transmission directly over the air medium. In another aspect, feedback control signals to the UE, which provide a positive or a negative acknowledgement for the UE's uplink data transmission, are transmitted by the macro base station, based on a signal received from the LPN over a backhaul connection. In yet another aspect, a downlink channel is used to communicate uplink transmission grants and schedule new data transmissions. Techniques are disclosed that work without sacrificing network capacity for any reasonable backhaul delay between the LPNs and the macro base station.

In one exemplary aspect, a method of facilitating operation of a base station in a cellular wireless communication system is disclosed. The base station controls a wireless device's uplink data transmissions over a shared uplink physical channel. The base station receives, over a backhaul network connection, and from a microcell base station, a control message indicating whether or not data was received during the time slot scheduled for the wireless device's uplink transmission. A response message is transmitted over a second physical communication channel in a second time slot that is a predetermined time period after the first time slot. When the control message is received prior to the second time slot, then the response message uses data reception information from the control message and when the control message is not received prior to the second time slot, then the response message indicates that the data was successfully received.

In another exemplary aspect, a wireless network node, such as a low power node, is configured to operate a wireless receiver to receive, in a first designated time slot, a first uplink transmission from a wireless device over a wireless network connection. When the first uplink transmission is successfully received, an acknowledgement message (ACK) is communicated to a network server over a backhaul connection. Otherwise, when the first uplink transmission is not successfully received, a negative acknowledgement message (NACK) is communicated to the network server over the backhaul connection. The wireless network node is controlled to refrain from transmitting ACK or NACK messages over the wireless network connection.

These and other aspects, and their implementations and variations are set forth in the drawings, the description and the claims.

BRIEF DESCRIPTION OF THE DRAWINGS

Like reference symbols in the various drawings indicate like elements.

DETAILED DESCRIPTION

Figure 1:
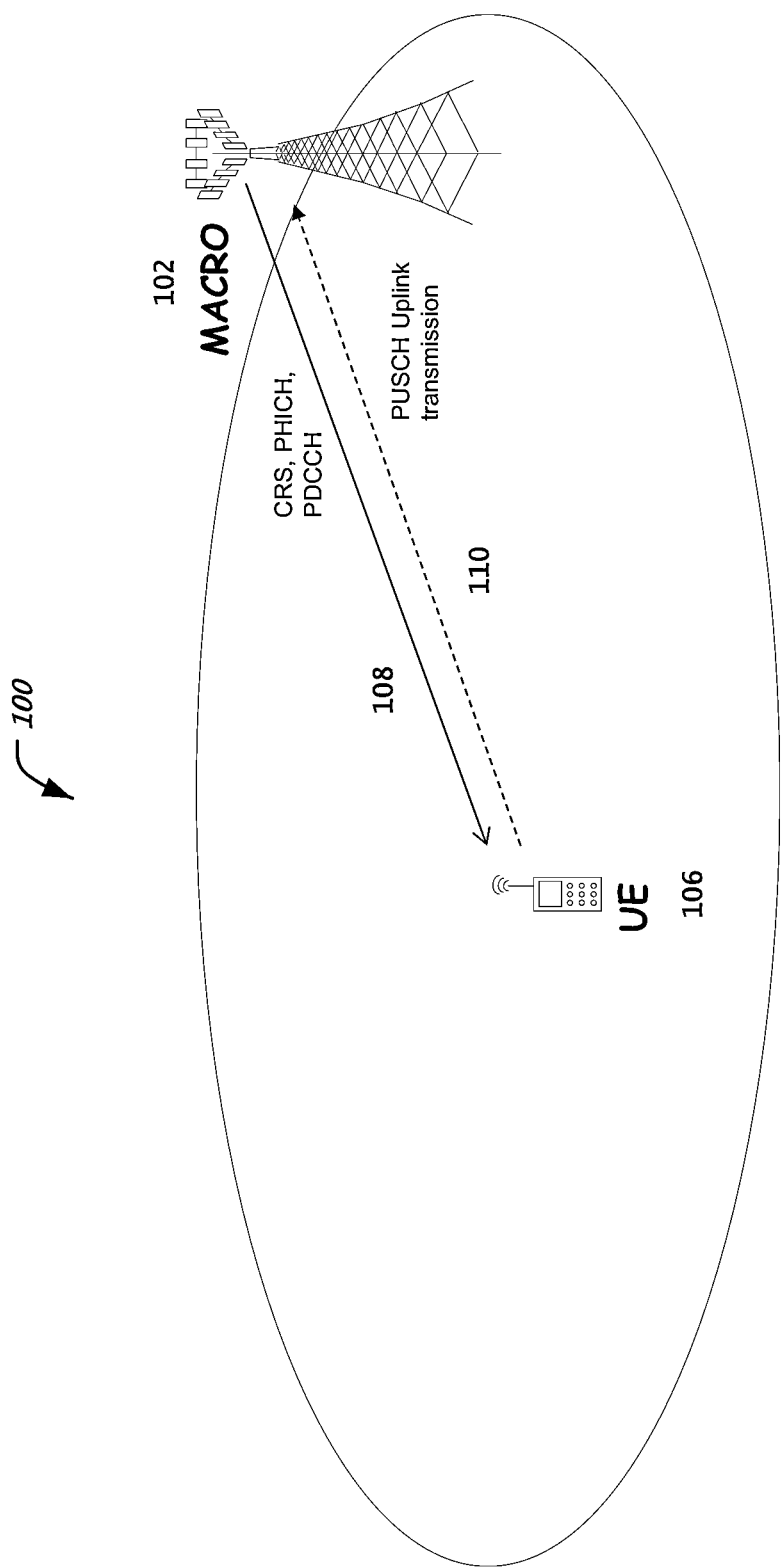
FIG. 1 depicts a wireless network.

The techniques disclosed in this document can be used, in one aspect, to control or reduce uplink transmission power expended by a wireless device when communicating data in the uplink direction (from the wireless device to the network). In another aspect, the disclosed techniques may be useful in heterogeneous networks, as further described below, to improve total availability of uplink bandwidth in the network. In yet another aspect, the disclosed techniques use macro and micro base stations in a coordinated manner, without specifically constraining the delays in backhaul communication link between the macro and micro base stations. These and other useful aspects are further discussed below.

A traditional cellular wireless network typically is arranged into one or more radio cells, where each radio cell is typically served by a single base station. In this arrangement, the base station is responsible for both uplink and downlink transmissions from/to user equipment (UE) and wireless devices such as phones, portable computers, data connectivity cards, and so on. To improve reliability of data transmissions in the uplink direction, techniques such as synchronous hybrid automatic repeat request (HARQ) are used. In synchronous HARQ and other similar techniques, the base station typically schedules the transmission of an acknowledgement to the UE to follow a data transmission from the UE. This acknowledgement (ACK) is scheduled to occur typically a fixed time (known to the UE) after the uplink transmission from the UE. This ACK delay time (called HARQ Delay in this document) may be a pre-determined time that does not change during the operation of the network. A traditional UE therefore looks for an acknowledgement from the base station a fixed amount of time (e.g., an integer number of time slots) after the UE transmits data in the uplink direction to the base station. For example, in frequency domain duplexed (FDD) operation of Long Term Evolution (LTE), if the UE performs uplink transmission in slot n (an integer), then a downlink ACK transmission is scheduled to occur at time slot (n+4). Similarly, in the time domain duplexed (TDD) operation of LTE, a fixed transmission delay, specified by configuration, is used between uplink signal transmissions and corresponding feedback. The uplink and downlink transmissions may either be performed using separate frequency bands in the FDD network or using different time-frequency resources in the TDD network.

In many wireless networks, various signals are transmitted using different physical transmission channels. For example, transmissions in the uplink directions (from UE to network) and the downlink directions (from the network to UEs) occur on different physical transmission channels. Often, the channels are "symmetric" in that the uplink and the downlink physical transmission channels may have same or similar frequency response. As another example of physical transmission channels, when multi-carrier communication such as orthogonal frequency domain multiplexing is used, a physical channel may correspond to a combination of time-frequency resources assigned for transmissions. As an example, LTE defines various physical communication channels such as physical hybrid automatic repeat request indication channel (PHICH) in the downlink direction and physical uplink shared data channel (PUSCH) in the uplink direction or physical downlink shared channel (PDSCH) and physical downlink control channel (PDCCH), etc.

In heterogeneous networks, several new operational issues arise with respect to the above-discussed implementations of uplink transmissions and downlink due to the introduction of microcell base station(s) to a radio cell of the cellular network. For example, with respect to uplink data transmissions, issues arise about which network node, among multiple microcell base stations and the macro base station, are suitable for uplink data reception and downlink acknowledgement transmission. One issue, for example, relates to the assignment of responsibilities for receiving or transmitting different signals in the above-discussed data transmission and acknowledgement schemes. Another issue (further described in greater detail below) relates to how the HARQ Delay budget can be met if the uplink transmission is received by the micro base station but acknowledged by the macro base station. For example, the backhaul communication link between a macro and a micro base station may have a delay that is equal to or exceeds the HARQ Delay, in which case the network might always be late in acknowledging an uplink data transmission. A third operational issue relates to coordinating uplink data receptions and downlink ACK transmissions when multiple micro base stations are in a position to receive uplink transmissions from a UE.

These issues remain unanswered by present day deployments and wireless standards. As a result, present day wireless systems are unable to fully exploit the benefits of the presence of these microcell base stations in HetNet radio cells. These, and other, issues can be solved using the techniques presented in this document.

In the Detailed Description section, headings are used only for improve readability of the document, and these headings do not limit the scope of the claimed subject matter in any way. Furthermore, certain aspects of the disclosed techniques are disclosed by providing specific examples from the Long Term Evolution (LTE) standard only for improving readability. However, the claimed subject matter can be practiced in any known or future cellular wireless networks, such as WiMAX, E-UTRA, 802.11x and other 2G, 3G or 4G networks.

Evolution from Non-Heterogeneous ("Legacy") Networks to Heterogeneous Networks

The techniques described in this document are applicable to a wireless network serving one or more user equipment (UE) devices, such as a mobile phone or a wireless communication device including a tablet or laptop computer. The wireless network can be a heterogeneous network (HetNet)

deployment having multiple tiers of communication nodes/ base stations such as macro base stations and micro base stations. A macro base station in such a HetNet has sufficiently high transmission power to cover a large macro cell area while a micro base station is a low power node (LPN) that covers a smaller area within the larger macro cell area.

One deployment choice is that the underlying Low Power Nodes do not have an own cell ID, instead they are all sharing the same cell ID with the Macro station. In some implementations, this design choice makes the cell planning easier and cuts down the handovers to be executed.

In legacy networks a radio cell is typically served by a single base station. Therefore, reference signals useful for calibrating downlink channel and downlink data transmissions are transmitted from the same base station. Legacy networks use a cell specific reference signal (CRS) that includes identification of the radio cell (cell ID). To maintain compatibility with "legacy" UEs, in heterogeneous networks, broadcast reference signals such as CRS may also be transmitted from the Macro node (base station). In different heterogeneous network embodiments, the LPNs may or may not transmit the CRS.

The transmission of CRS from the LPNs could result in unwanted interference and may decrease network performance. Therefore, some heterogeneous networks may not transmit CRS from the LPNs. However, the introduction of LPNs that do not perform CRS transmissions in heterogeneous networks may mean that legacy UEs, which expect data and reference signal transmission from over a same communication channel, may not be able to interoperate with these LPNs and may have to be served exclusively macrocell base stations when LPNs do not transmit CRS. By contrast, newer UEs, that are designed and built to interoperate with LPNs may be able to be served either by LPNs or by macro base stations, or both. As a specific example, UEs according to LTE Release version 8 to 10 UEs are not expected to take advantage downlink control signaling from the LPN and may have to be served exclusively from the Macro station. In other words, without the benefit of the techniques disclosed in this document, the presence of legacy UEs in a heterogeneous network may mean that the heterogeneous network may have to operate at a less than optimal setting. This problem could be significant in certain deployments because it is expected that a significant percent of the UEs in the next few years will still be legacy UEs. Techniques that improve network operational efficiency in the presence of legacy UEs will therefore benefit present day cellular wireless networks.

FIG. 1 depicts a radio cell 100, such as the above discussed legacy network cell, which includes a macro base station 102, serving at least one user equipment UE 106. The signals transmitted in the uplink direction, from UE 106 to macro base station 102, include uplink data transmissions 110. As an example, in LTE, uplink data transmissions may be performed on physical uplink shared channel (PUSCH). The signals transmitted in the downlink direction (108) include previously discussed CRS, and downlink control signals, the use of which is described in greater detail below. For example, in LTE, the downlink signals 108 include messages transmitted over the Physical Downlink Control Channel (PDCCH) and the Physical Hybrid Indicator Channel (PHICH).

Hybrid Automatic Repeat Request (HARQ)

Figure 2:
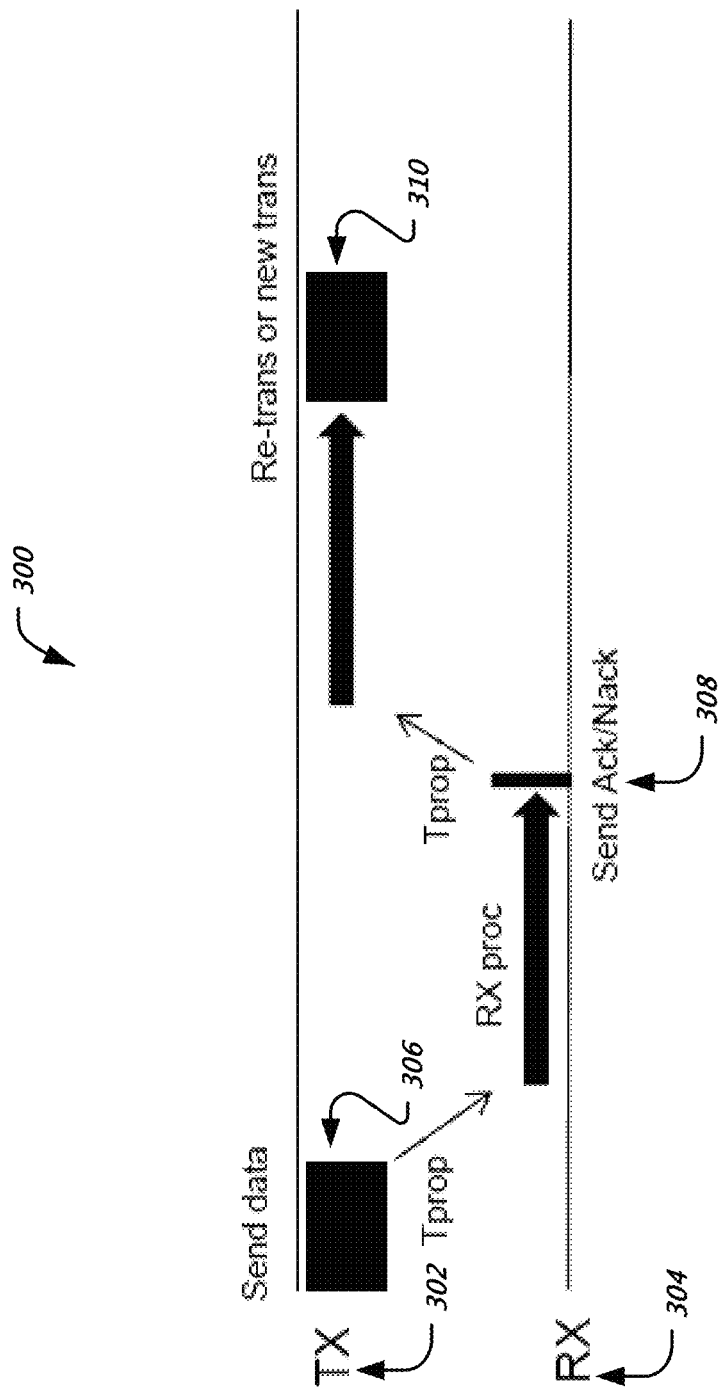
FIG. 2 depicts a timeline of data transmissions from user equipment (UE) and corresponding acknowledgments from network to UE.

FIG. 2 depicts an example timeline 300 of how data is transmitted in the uplink direction in present day wireless systems. In FIG. 2, time increases linearly from left to right. The transmit side 302 of UE 106 sends a data block 306 on the uplink. The receive side 304 of the base station 102 receives and processes the transmission from the UE 106 ("RX proc") and sends an ACK (if data was correctly received) or a NACK (if data was not correctly received) at a time 308 to the UE 106. The time Tprop represents the propagation delay through the air medium. At time 310, the UE 106 has received and processed the ACK/NACK and based on the indication from the base station 102, the UE 106 transmits either a new data block (typically when an ACK is received) or re-transmits previous data block (typically when a NACK is received) as transmitted data block 310.

Figure 3:
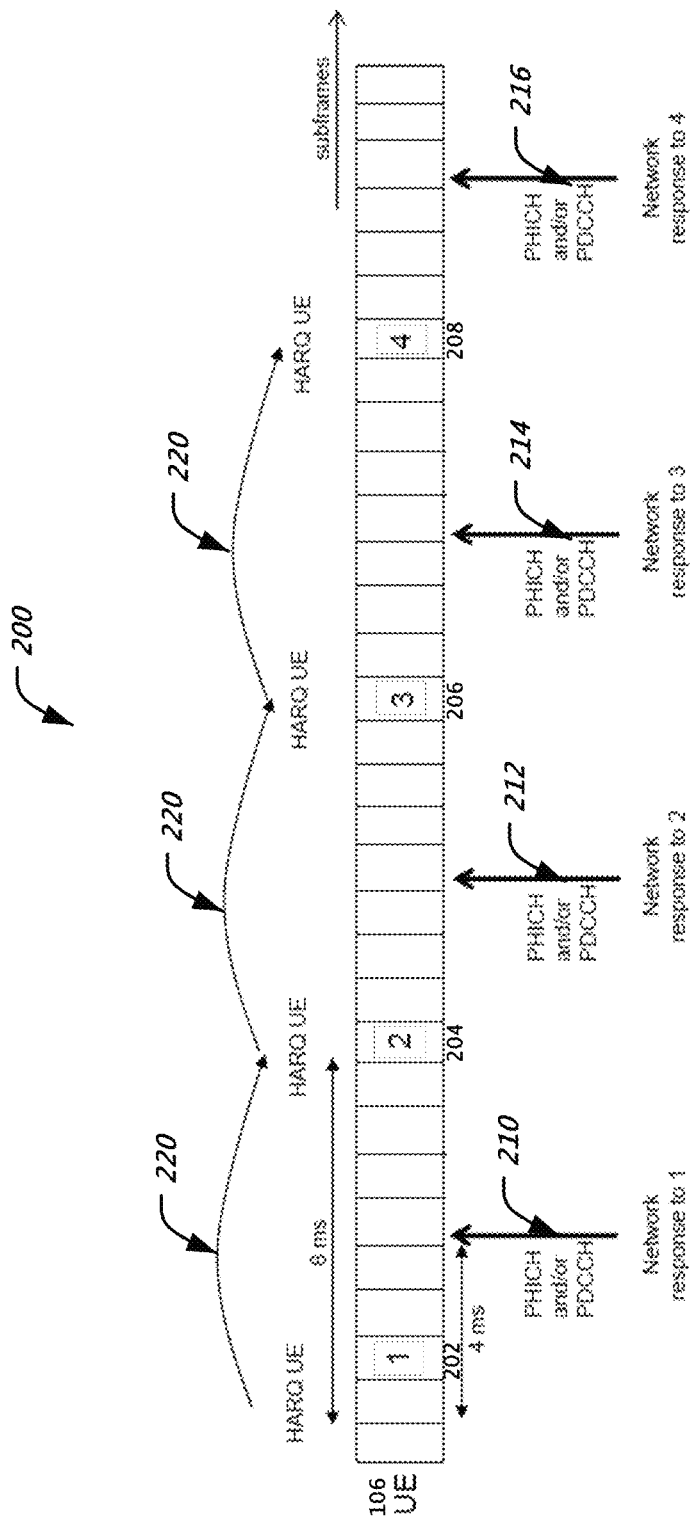
FIG. 3 depicts a timeline of uplink data transmission.

FIG. 3 depicts timeline 300 showing HARQ scheme used in the legacy LTE systems (Release 8 to Release 10). In this HARQ protocol, the UE 106 sends data on the PUSCH (e.g., transmission slots 202, 204, 206, 208) and receives feedback about the data transmission on either PHICH or on both PHICH and PDCCH (at times 210, 212, 214 and 216 that are 4 milliseconds after 202, 204, 206 and 208). The PHICH channel indicates with an ACK/NACK the successful reception of the data packet (transport block) in the base station 102. In case of a NACK, the UE 106 knows that the sent package has not been received successfully by the base station 102. If the UE 106 does not receive any other command with higher priority on the PDCCH in the same sub-frame, it will then initiate a retransmission of the previously sent package. The transmission process 220 is repeated by UE 106 when it has pending data for uplink transmission.

In LTE, the base station 102 can use PDCCH along with or instead of PHICH, the eNB to control the UE 106 to transmit new data or to retransmit the previous packet. From a UE's perspective, the PDCCH instructions trump the ACK/NACK indicators sent on the PHICH.

The UE behavior in LTE upon the reception of PHICH and PDCCH is summarized in Table 1 below:

TABLE 1

UE transmission depending on the different possibilities of PHICH and PDCCH reception in the same sub-frame

| PHICH indicator | PDCCH | UE transmission |
|---|---|---|
| ACK or NACK | Transmission of new data | Transmission of new data |
| ACK or NACK | Retransmission | Retransmission |
| ACK | None | No Transmission, but keep previous data in HARQ buffer |
| NACK | None | Retransmission |

To summarize the behavior expected from legacy UEs 106 operating using LTE, the transmission of data using a certain HARQ process 220 may occur every 8th sub-frame. The ACK/NACK feedback has to be received by the UE 106 four sub-frames after the start of the corresponding transmission (and hence 4 sub-frames before the possible start of a new transmission using the same HARQ process).

Suitable Heterogeneous Network

Figure 4A:
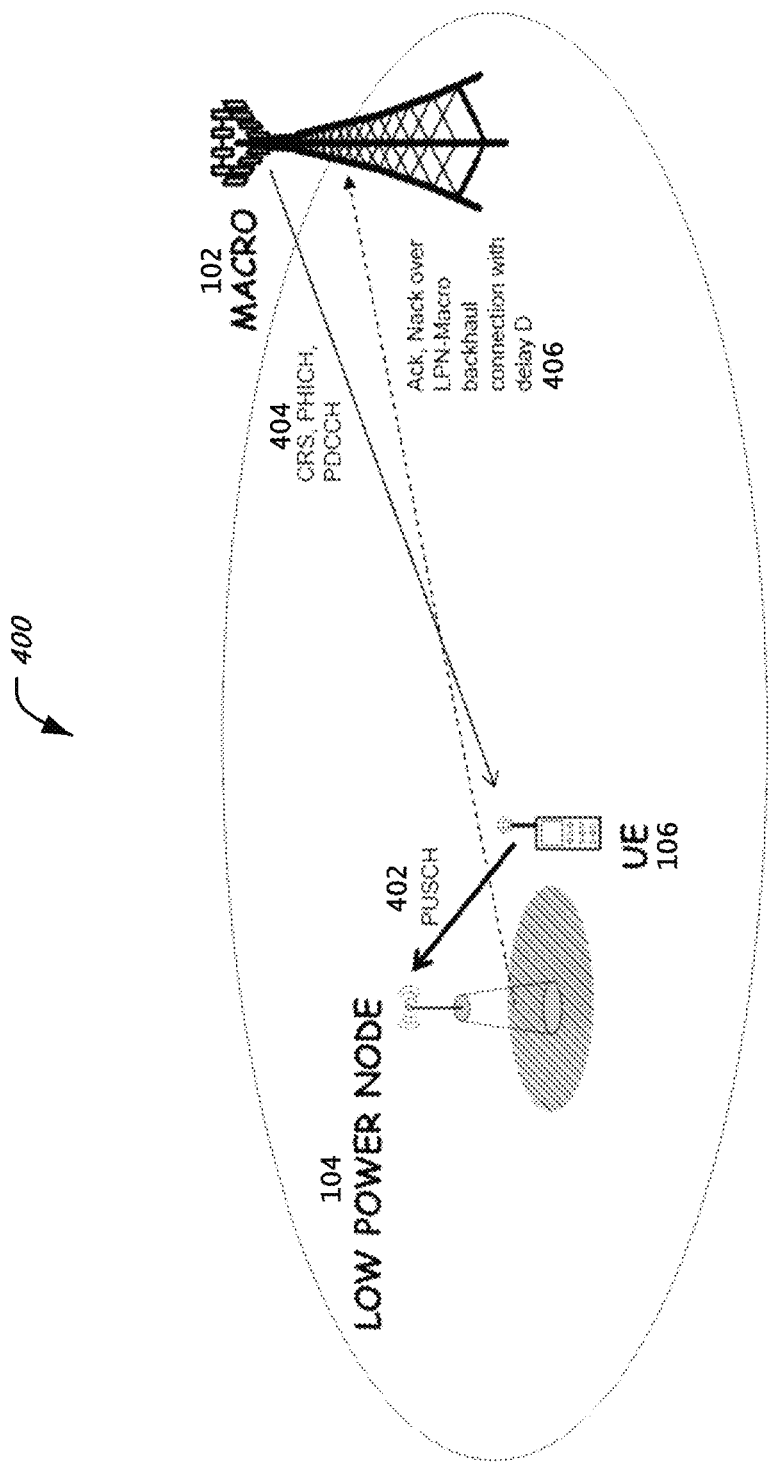
FIG. 4A depicts a heterogeneous wireless network deployment scenario.

FIG. 4A depicts a radio cell 400 of a heterogeneous wireless network. The radio cell 400 is served by a macro base station 102 and at least one micro base station or low power node LPN 104 providing wireless coverage in the radio cell, at least partially overlapping the coverage area of the macro base station 102. In some implementations, the macro base station 102 provides downlink channels 404 such as CRS, PHICH and PDCCH, e.g., to maintain backward compatibility with any legacy UEs 106 in the radio cell. However, in some situations, the UE 106 may transmit uplink data, which is decoded by the LPN 104 (in contrast to radio cell 100, where uplink data was received and decoded by the macro base station). In some implementations, the uplink data transmission may be performed (under the control of the network) at a power level that enables reception and decoding by the LPN 104, but not by the macro base station 102. For example, in LTE, the uplink data transmission 402 may use PUSCH.

The uplink data transmission and the downlink feedback scheme is illustrated in FIG. 4A. In a typical LTE network, the following steps are carried out:

The UE 106 transmits data 402 in a HARQ process at sub-frame n using PUSCH. The UE 106 may be a legacy or a newer UE, and need not know whether the recipient of the uplink transmission is the macro base station 102 or the LPN 104.

The LPN 104 decodes the data and decides if the packet has been received successfully or not. The LPN 104 generates an ACK or NACK.

The LPN sends the ACK/NACK indication over the backhaul connection 406 to the Macro station 102. The backhaul connections between the LPNs and the Macro stations can be realized with different technologies (e.g. microwave connection, optical fiber, Ethernet, etc.), resulting in different performances in terms of capacity and delay.

At sub-frame n+4, the Macro base station 102 sends feedback (message 404) regarding the data packet to the UE 106. The Macro base station 102 is using either PHICH or PDCCH or both channels for this.

Figure 4B:
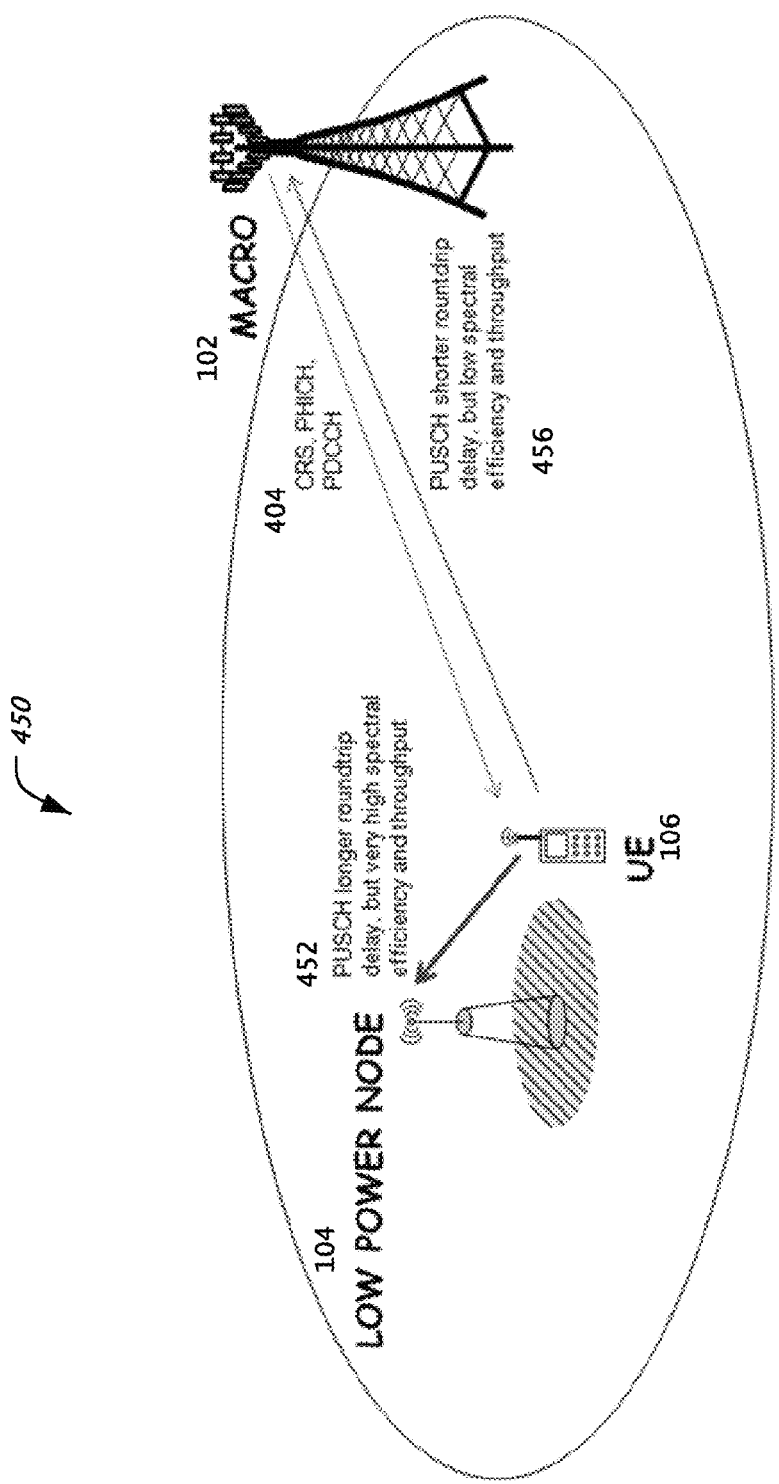
FIG. 4B depicts a heterogeneous wireless network deployment scenario.

Depending on the backhaul delay between the LPN 104 and the Macro 102, the Macro may or may not receive the LPN's ACK/NACK early enough to be able to send the response in sub-frame n+4. The amount of backhaul delay in a radio cell leads itself to various operational possibilities, which are further described below. In the example system 450 depicted in FIG. 4B, the UE transmits a PUSCH signal 452 to the low power node. The PUSCH may have a longer round trip delay, but typically has a high spectral efficiency and throughput. The UE 106 may communicate with the Macro base station 102 in the uplink direction via a PUSCH transmission 456 and may receive transmissions 404 such as CRS, PHICH and PDCCH in the downlink direction.

Figure 5:
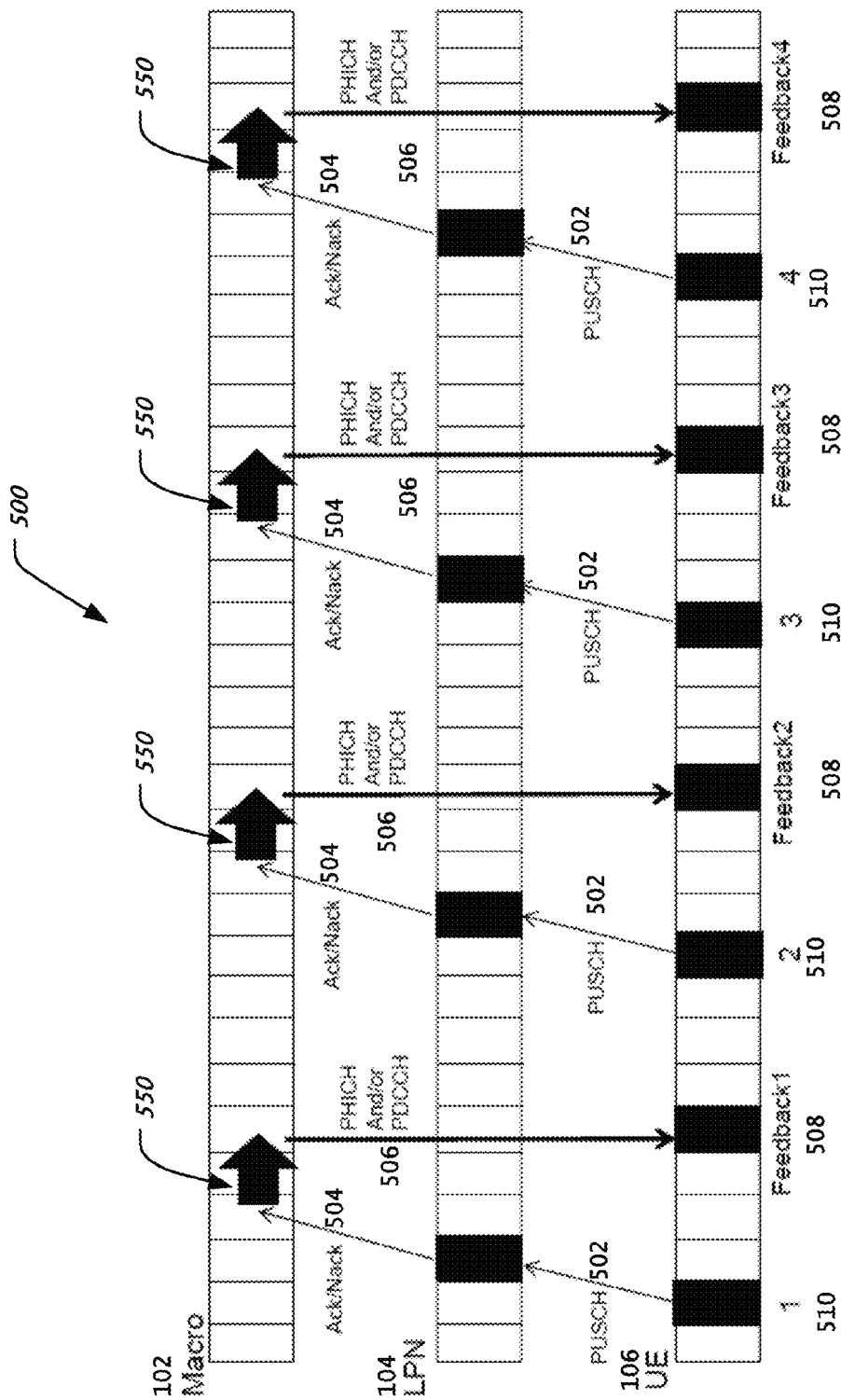
FIG. 5 depicts a timeline of data transmissions from user equipment (UE) to network and corresponding acknowledgments from the network to UE.

FIG. 5 is a timing diagram 500 depicting the operation of HARQ in a heterogeneous network in which the backhaul delay is sufficiently small to meet the timing budget expected by UEs for receiving ACK/NACK. As previously discussed, the uplink/downlink responsibilities are distributed between the Marc node 102 (which transmits the ACK/NACK) and LPN 104 (which receives the uplink transmission). In general, the LPN cannot send the PHICH/PDCCH by itself because it is not transmitting CRS.

Working from left to right in FIG. 5, which indicates linearly increasing time, the UE 106 performs uplink data transmission (502) over the PUSCH. This transmission is received (or not) by the LPN 104, which generates and transmits an Ack/Nack 504 to the Macro 102. After processing delay 550 internal to the macro base station 102, the macro base station 102 performs a downlink transmission of the Ack/Nack 506 to the UE 106 over the PHICH and/or PDCCH. The UE 106 receives the feedback signal at time 508, as would expected by the UE 106 according to the LTE specification. The signal messages are repeatedly exchanged as previously discussed when UE 106 performs uplink data transmission.

It can be seen from the timeline 500 that the communication and processing delay through the backhaul needs to be approximately not more than 3 ms. Practical implementations other than fiber optic lines may find this delay too tight to meet. For price and complexity, many HetNet deployments would prefer to use backhauls with a significantly larger delay. As further discussed below, in that case, the Macro base station 102 will not receive the ACK/NACKs in time.

Long Acknowledgement Delays

Figure 6:
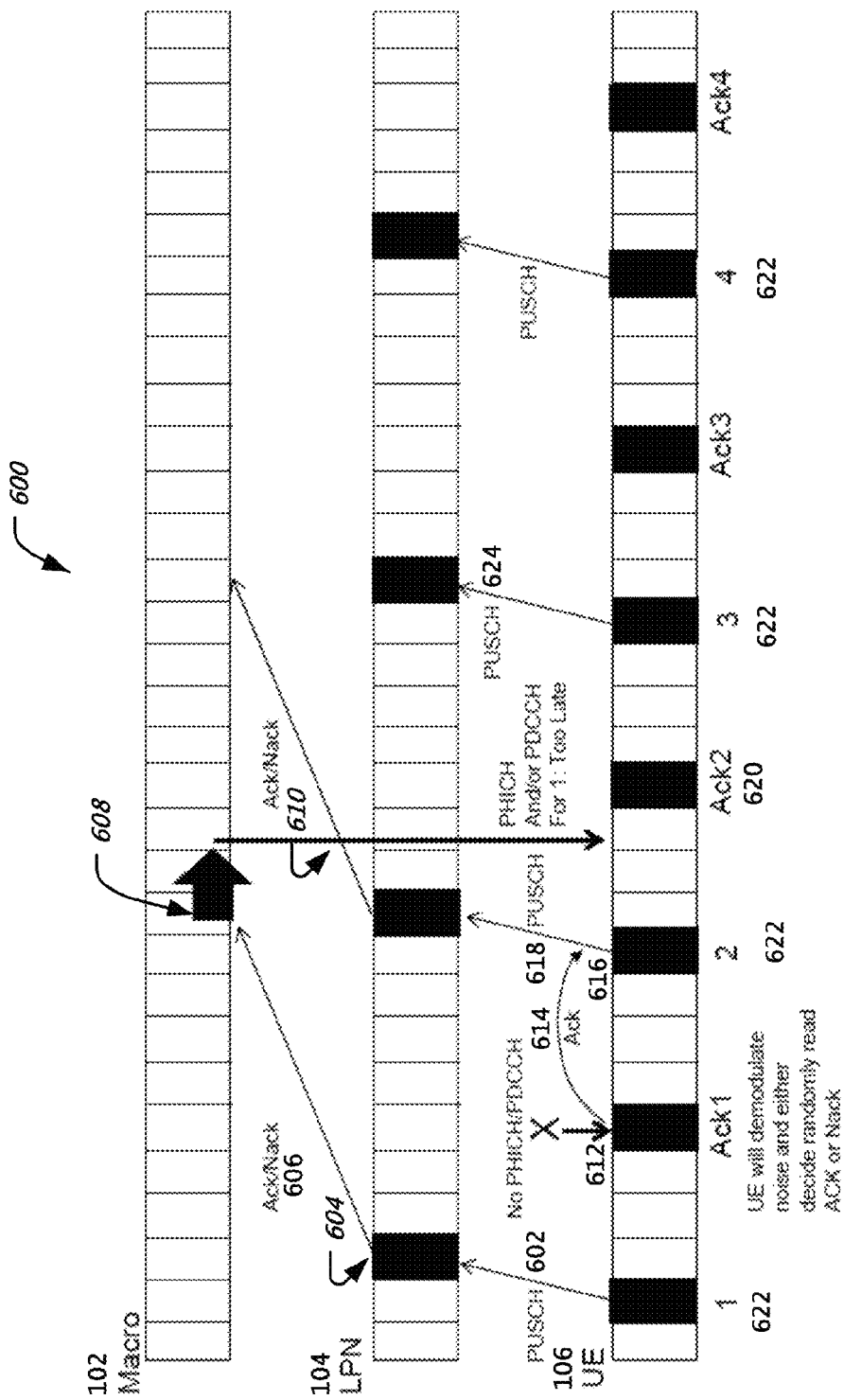
FIG. 6 depicts a timeline of data transmissions from UE to network and corresponding acknowledgments from the network to UE.

FIG. 6 depicts an example when the backhaul delay is too long for the macro base station 102 to provide ACK/NACK to the UE 106 at the first scheduled ACK/NACK time slot. Without limiting, only for illustrative purpose, backhaul delay of approximately 8 ms is assumed in timeline 600. The LPN 104 receives uplink transmission (604) from the UE 106, that is then processed and a corresponding ACK/NACK 606 is transmitted to the macro base station 102. The delay incurred by the ACK/NACK 606 through backhaul is approximately 8 msec. After the processing delay 608, at the next possible opportunity, the macro base station 102 transmits ACK/NACK 610 in the downlink over PHICH and/or PDCCH, which is received by the UE 106 at time slot 620. However, time slot 620 occurs too late for the UE 106's transmission of the data packet 622 because UE 106 expected an ACK at time slot 612 (4 milliseconds after data transmission).

A problem that comes up is that because the UE 106 is expecting a PHICH transmission at time slot 612, the UE 106 still decodes on the PHICH resources on sub-frame n+4 (at slot 612). The Macro 102 has not received the correct ACK/NACK from the LPN 104 yet so at time slot 612, it cannot send the true ACK/NACK to the UE In FIG. 6 at time slot 612, the Macro 102 sends no response to the UE. The UE 106 will still decode, since it is expecting an answer. But it will decode only noise on PHICH and make a random decision whether ACK or NACK has been received. The ACK/NACK that the UE "believes" to have received may not be consistent with the real ACK/NACK 606 that LPN 104 previously had generated and sent to the Macro base station 102.

Since the PDCCH has not been received in sub-frame n+4 at time slot 612, then according to Table 1, there are two possibilities for the next UE transmission (at time slot 616): If the UE has (randomly) detected an ACK 614, it will not send anything and if it had detected a NACK, it will perform a retransmission in sub-frame n+8. This uncontrollable UE behavior can be avoided using the techniques disclosed in this document.

Figure 7:
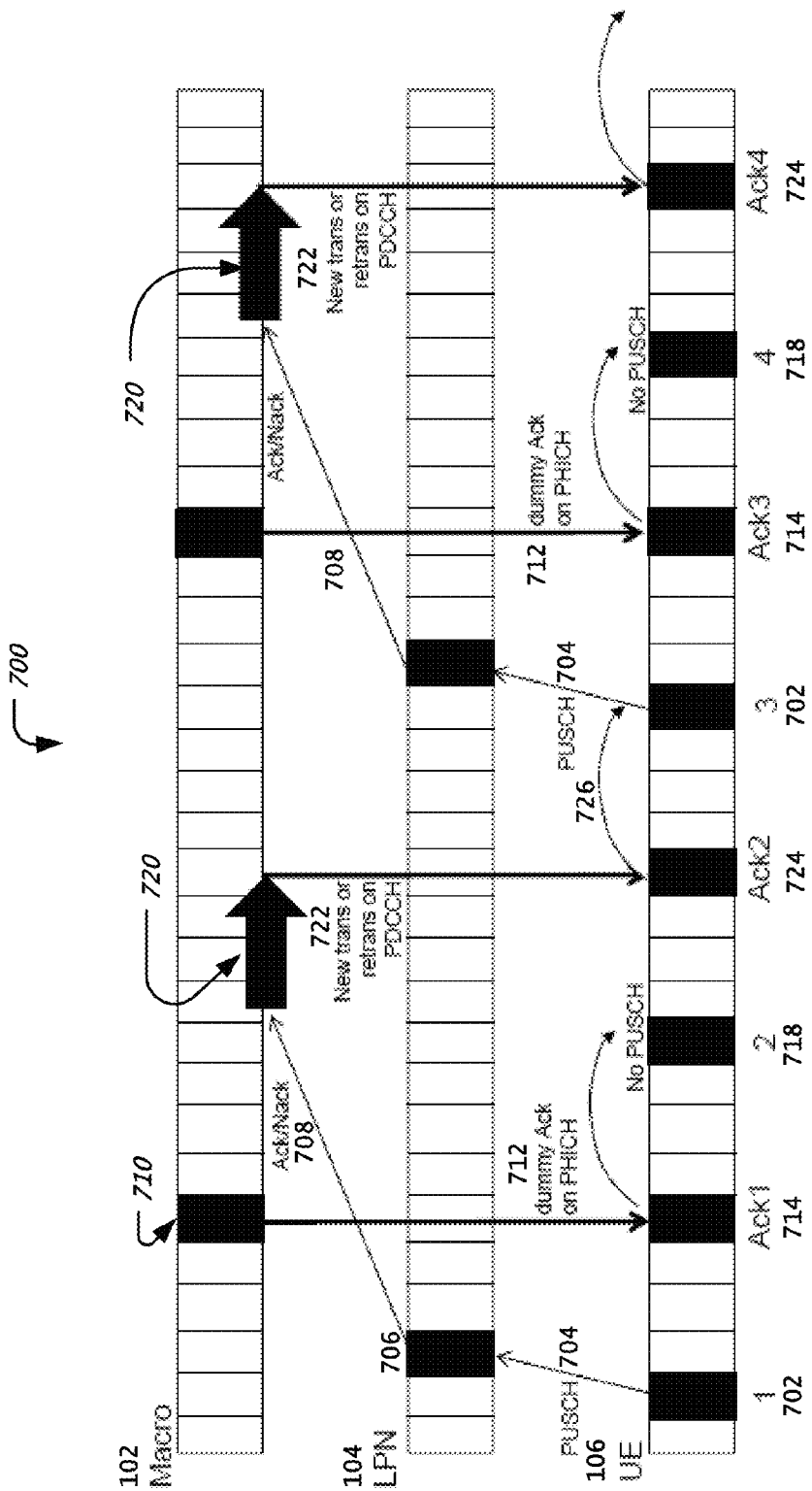
FIG. 7 depicts a timeline of data transmissions from UE to network and corresponding acknowledgments from the network to UE.

Referring to the timeline 700 depicted in FIG. 7, in some implementations, the macro base station 102 is configured to always transmit a dummy ACK 712 at the sub-frames n+4, when operating in a heterogeneous network with longer backhaul delays. At time slot 702, the UE 106 transmits data 104 over PUSCH. The data is received (or not) at LPN 104 (706). The LPN 104 sends a corresponding ACK/NACK 708 to the macro base station 102. Prior to the macro base station 102 receiving the ACK/NACK 708, it generates a dummy ACK 712 on PHICH and transmit to the UE 106, so that the UE 106 receives an ACK at time slot 714 at which the UE 106 expects the feedback message. As a result of this, the UE 106 does not retransmit the data from time slot 702 again in time slot 718.

By providing the UE 106 with a dummy ACK 712, under the absence of a PDCCH instruction, avoids a possibly unnecessary retransmission at the next available HARQ sub-frame but the data remains stored in the UE 106 in its HARQ buffer (see Table 1). Thus, in one advantageous aspect, the behavior of the UE 106, when a dummy ACK 712 is used, becomes well-defined. Once the true ACK/NACK 708 has arrived at the Macro node 102 and been processed (720), the Macro base station 102 can use the PDCCH to order the transmission of new data 726 (if ACK) or a retransmission (if NACK), as indicated by message 722. Note that, based on the scheduler function implemented at the macro base station 102, a new transmission in case an ACK has been received may or may not be granted to the UE 106 that transmitted data in time slot 702. For example, the scheduler could decide to let another UE 106 transmit at the next occasion 718. This situation is not explicitly depicted in FIG. 7 because the purpose of the figure is to explain the timing relationships between dummy ACKs, backhaul delay, and PDCCH commands from the macro base station 102.

Figure 8:
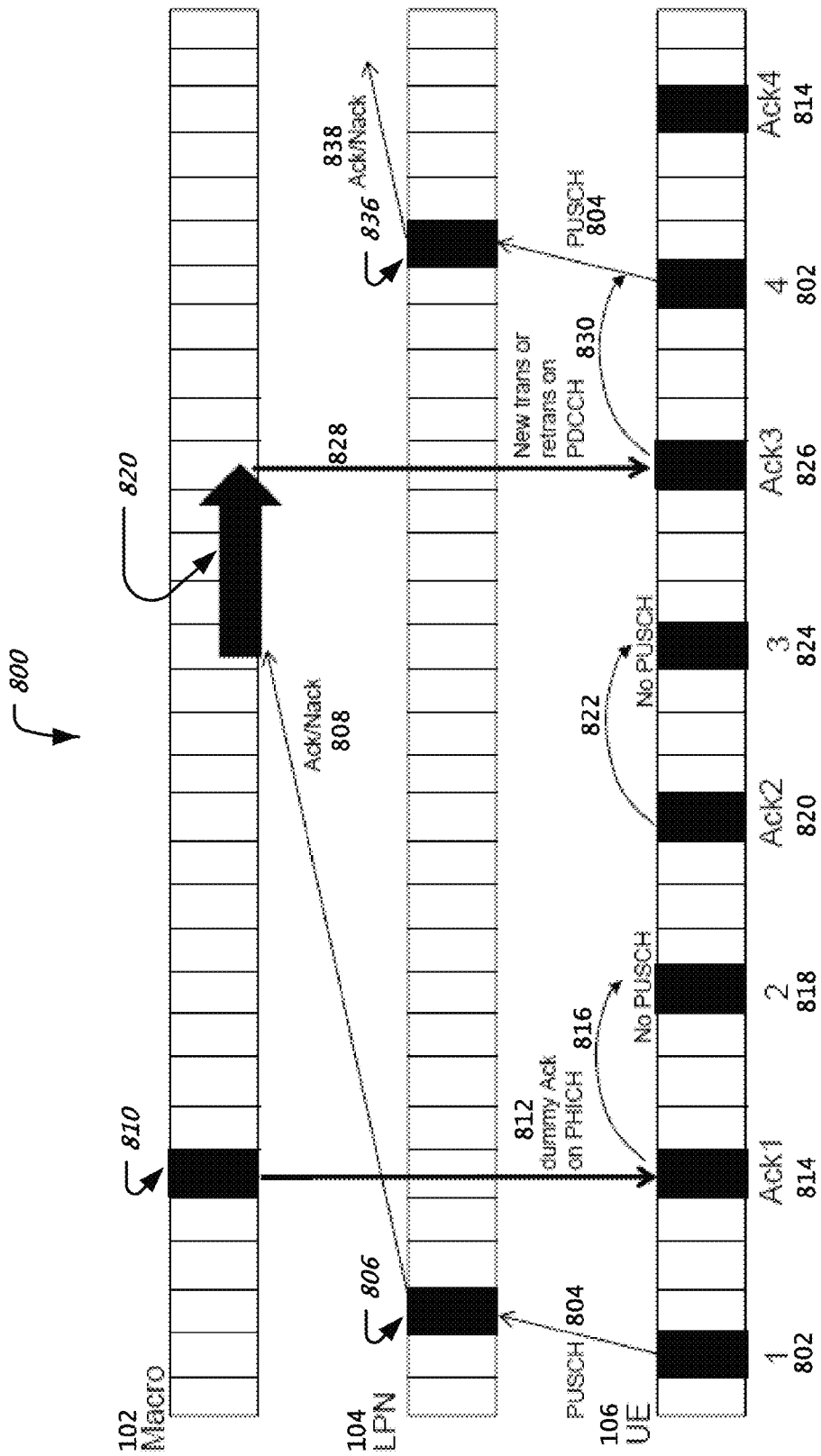
FIG. 8 depicts a timeline of data transmissions from UE to network and corresponding acknowledgments from the network to UE.

FIG. 8 depicts a timeline 800 in which the backhaul delay for conveying ACK/NACK from the LPN 104 to the macro base station 102 exceeds multiple uplink transmission opportunities. An uplink transmission from UE 106 in the time slot 802 is received at the LPN 104 at time 806. This ACK/NACK is provided by the LPN 104 to the macro base station 102 via backhaul ACK/NACK 808. After the base station 102 processes the received ACK/NACK, indicated by processing delay 820, the macro base station 102 transmits a new transmission or a re-transmission request in the PDCCH 828 to the UE 106 in time slot 826. As instructed (message 830), UE 106 either re-transmits or newly transmits data in time slot 802, repeating data transmission cycle previously described from the 802 time slot.

In the examples above it is illustrated how a UE 106 of any LTE release can send its PUSCH to the LPN 104 instead of being forced to transmit to the possibly less efficient Macro base station 102 or to transmit CRS from the LPN 104.

Furthermore, it can be seen from the examples discussed with respect to FIGS. 5, 6, 7 and 8 that, in some embodiments, the uplink transmissions from a UE 106 may occur in time slots that may be a fixed time apart (e.g., 4 milliseconds, 8 milliseconds, etc.). The term round trip delay refers to the time between a transmission and the retransmission or transmission of new data for a HARQ process, as discussed previously. As seen from FIG. 5, the round trip delay for a legacy LTE uplink is 8 sub-frames (number of time slots between uplink transmission slots 510). As can be seen from FIGS. 6, 7 and 8, the round trip delay of the HARQ process will increase dependent on the delay introduced by the backhaul connection. A backhaul delay of approximately 3 ms or less does not result in any extra delay (FIG. 5), the fastest possible round trip time of 8 msec is still possible. When the backhaul delay approaches 7 ms, the roundtrip delay for one HARQ process doubles to 16 msec (see, FIGS. 6, 7) and with a backhaul delay of approximately 15 ms, the round trip delay becomes 24 ms (FIG. 8).

It may appear that the introduction of LPNs 104 increases the round trip delay in the network and may end up reducing the uplink transmission bandwidth available to each UE 106 in the network. However, in some operational scenarios, it would be incorrect to draw the conclusion that the uplink throughput for the UE 106 will reduce by the introduction of LPNs 104, compared to an uplink scheme where the PUSCH is always decoded in the Macro 102 instead. One advantage of the disclosed techniques is that the uplink data may only be transmitted at a power level that is sufficient for decoding by a LPN 104, instead of possibly having to use higher power for transmission to the Macro base station 102. In one advantageous aspect, by limiting uplink transmission power from UEs 106, possible interference with other UEs can be avoided. In another beneficial aspect, the battery life of a UE could be significantly improved by lowering uplink transmission power used by the UE 106. In yet another beneficial aspect, because UE's low power uplink transmission are limited to be within a small geographical regions, uplink frequency can be re-used by spatially multiplexing the use between with other additional LPN coverage areas, thereby improving bandwidth efficiency of the HetNet. Having a UE transmit its data with less power introduces less interference into the cell and allows more UEs to share the same radio resources (being decoded by different nodes on the same resources without interfering each other).

In one advantageous aspect, UE 106 operating in a HetNet could be controlled to perform uplink transmissions either to LPN 104 or to macro base station 102, depending on operational requirements of UEs 106 (uplink latency, battery life, traffic load on the network, etc. For example, absent other conditions, the UE 106 may be performing uplink transmissions to the LPN 104. When short delay is more important that data rate, then the UE 106 may be transmitting to the macro base station 102. When the UE 106 battery is charged above a high threshold, the UE 106 may perform uplink transmissions to the macro base station. When UE's available battery power falls below a low threshold, the UE 106 may be directed to transmit to the LPN 104.

Backhaul Latency and Uplink Throughput

In addition to allowing the use of LPNs to be used as the receiving nodes for uplink transmissions from UEs, 106, in some configurations, the previously disclosed timelines 500, 600, 700 and 800 could also be used to maintain or improve uplink bandwidth throughput of a wireless network as a whole, regardless of the value of backhaul delay, i.e., whether backhaul delay is more or less than a delay budget for providing HARQ feedback to the UE 106. For example, with reference to FIGS. 7 and 8, in some embodiments, when a dummy Ack (712 or 812) is transmitted to the UE 106, the UE 106 concludes that its data has come through successfully. The HARQ process for that UE 106 can be suspended and the upstream resources are freed (e.g., subsequent uplink time slots) and can be used by another UE's HARQ process.

One example implementation of uplink bandwidth utilization in an LTE network is as follows:

(1) Assign a HARQ process "n" (n is one out of eight) to UE1; n is equal to a sub-frame number modulo 8. n=(Sub-frame number MOD 8).

(2) On sub-frame n, the UE transmits data over PUSCH (3) The LPN decodes the data and generates ACK/NACK (4) The LPN sends the ACK/NACK over the backhaul to the Macro (5) The Macro keeps track of the sub-frame numbers. At sub-frame n+4 it must transmit ACK/NACK to UE1.

(6) If the Macro has not received the true ACK/NACK from the LPN before n+4, it will send a dummy ACK to UE1 and schedule other UEs on the resources that were reserved for retransmission in sub-frame n+4

(7) The HARQ process n of UE1 may not be used until the true ACK/NACK has been received by the Macro. But the scheduler can assign the HARQ process of other UEs meanwhile. This is repeated until the true ACK/NACK has been received from the LPN.

(8) The Macro receives the true ACK/NACK. If it is a NACK, then a retransmission of HARQ process n is scheduled, using PDCCH in the appropriate sub-frame. If it is an ACK, then HARQ process n can be used for new data transmission again.

Logical Zones in the Operation of Heterogeneous Networks

Figure 9:
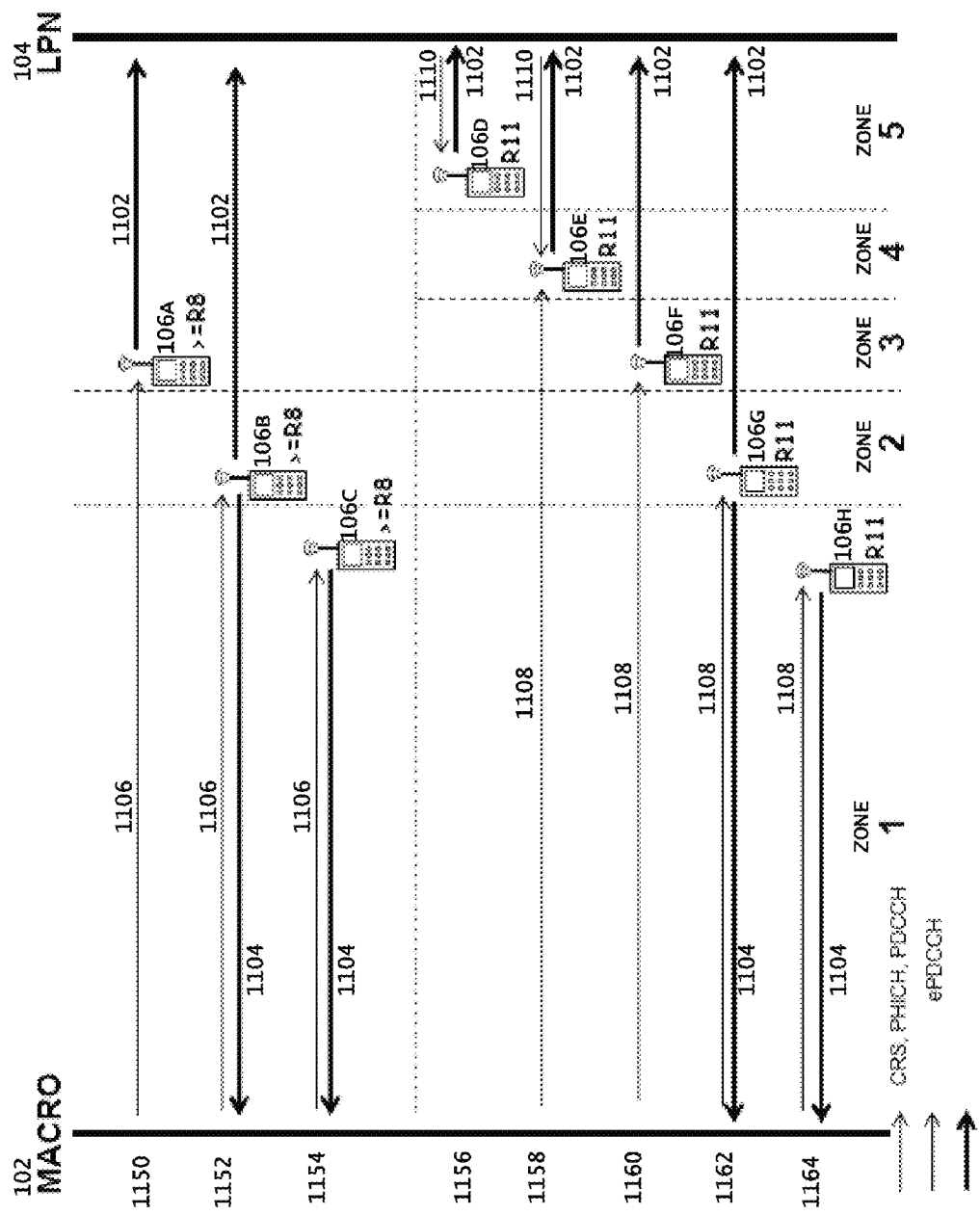
FIG. 9 depicts logical zones of a heterogeneous wireless network.

FIG. 9 depicts the operation of a HetNet, as discussed above, in terms of logical zones of the HetNet. Three different legacy UEs, 106a, 106b, and 106c are shown located at three different operational scenarios 1150, 1152 and 1154 respectively. In scenario 1150, UE 106a is closer to LPN 104 (in Zone 3, Zone 4 or Zone 5), compared to Macro base station 102. In this scenario, the UE 106a receives downlink broadcast channels 1106 (e.g., CRS, PHICH and PDCCH) from the Marco base station 102. However, the UE 106a transmits uplink data 1102 to the LPN 104. In the operational scenario 1152, the UE 106b is located in Zone 2, in which it is able to communicate both with the Macro base station 102 and LPN 104. In scenario 1152, the UE 106b thus can transmit uplink data to both LPN 1104 (1102) and the Macro base station 102 (1104). The UE 106b receives downlink broadcast signals 1106 from the Macro base station 102.

In scenarios 1156, 1158, 1160, 1162 and 1164, deployment scenarios with newer UEs 106, such as a Release 11 (R11) phone for the LTE standard, are depicted. The channel mapping depicted in FIG. 9 is dependent on which region the UE 106 is located in and the following regions are possible:

Uplink (UL) LPN: UE 106 transmissions can be decoded by the LPN

UL OL: UE is in overlap area. Can be decoded by both Macro and LPN

UL Macro: UE cannot be decoded by LPN. Only by Macro

DL LPN: UE can receive downlink signals from LPN

DL OL: UE can receive signals from both LPN and Macro. Joint Transmission is performed in downlink for control signaling.

DL Macro: LPN cannot send signals to UE. UE must receive downlink signals from Macro.

Zones 1 to 5 in FIG. 9 can be defined as follows.
Zone 1: UL Macro and DL Macro coverage region
Zone 2: UL overlap and DL Macro coverage region
Zone 3: UL LPN and DL Macro coverage region
Zone 4: UL LPN and DL overlap coverage region
Zone 5: UL LPN and DL LPN coverage region An example for the channel mapping is summarized in Table 2 below. Note that in the first column, Rn stands for Release n of LTE. Similarly, while Release 11 (R11) does not explicitly include an enhanced PHICH (ePHICH), it is understood that in future implementations, the "ACK/NACK channels" column could be modified to include ePHICH in subsequent releases or that it at least includes new functionality that allows sending "ACK/NACK" from a node to a UE without the requirement of CRS transmission. (this is specifically useful for UEs that use DMRS (and not CRS) for demodulation.

TABLE 2

Channel Transmission and Reception Point depending on UE location in UL and DL

| UE release | ACK/NACK channels | UL region | DL region | PUSCH decoded at | DL channels transmitted from |
|---|---|---|---|---|---|
| R8-R11 | PHICH/PDCCH | LPN UL | any. | LPN | Macro |
| R8-R11 | PHICH/PDCCH | OL UL | any. | LPN + Macro | Macro |
| R8-R11 | PHICH/PDCCH | Macro UL | any. | Macro | Macro |
| R11 | ePDCCH | LPN UL | LPN DL | LPN | LPN |
| R11 | ePDCCH | LPN UL | OL DL | LPN | LPN + Macro |
| R11 | ePDCCH | LPN UL | Macro DL | LPN | Macro |
| R11 | ePDCCH | OL UL | Macro DL | LPN + Macro | Macro |
| R11 | ePDCCH | Macro UL | Macro DL | Macro | Macro |

It should be noted that the above listed channel mappings are merely given as possible examples in LTE networks, but other mappings in an LTE network and other non-LTE networks are possible.

Multiple LPN Scenario

In some configurations, multiple LPNs 104 may be able to receive uplink transmissions from a given UE 106. In such a case, it may be possible for more than one LPN 104 to attempt to receive the uplink transmission and send ACK/NACK to the macro base station 102. In that case, the Macro 102 could receive ACK/NACKs from several LPN.

In some implementations, the Macro 102 may therefore wait until it hears back from all possible LPNs 104 or until it receives a first ACK from any LPN 104 before the macro base station 102 communicates an ACK/NACK to the UE 106.

Figure 10:
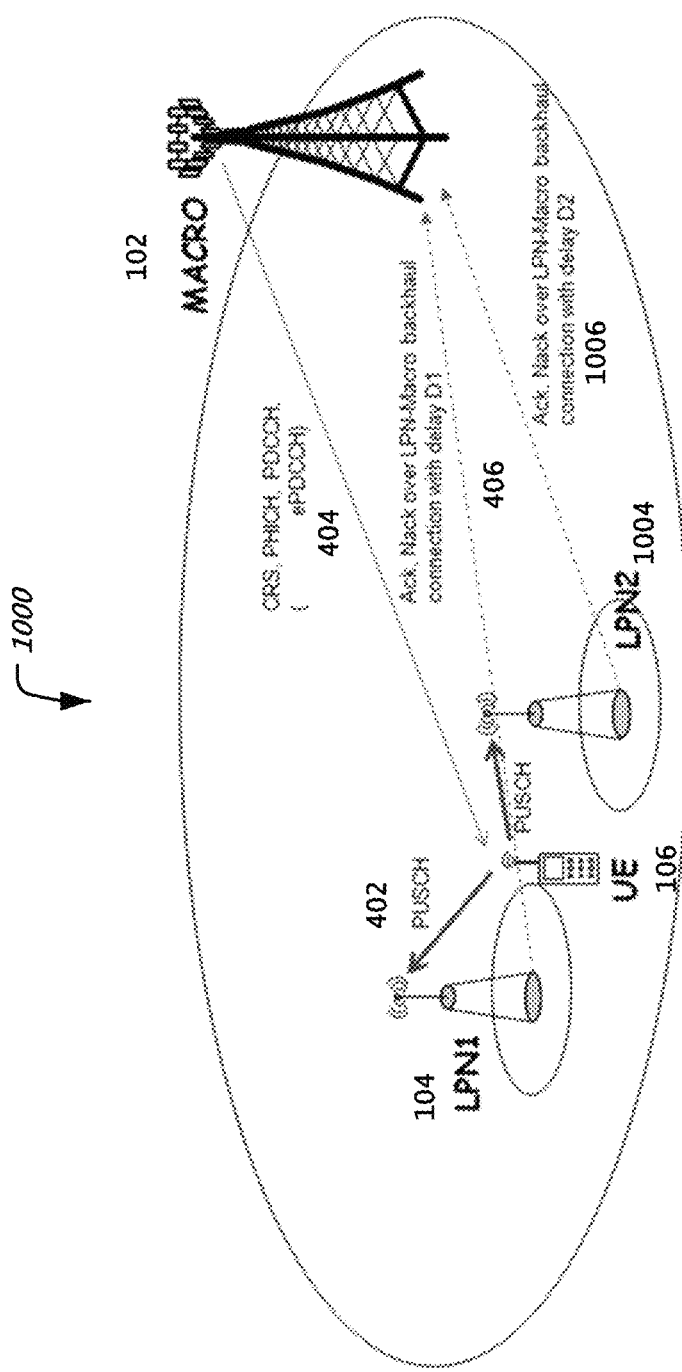
FIG. 10 depicts a heterogeneous wireless network deployment scenario which includes multiple low power nodes (LPNs).

With reference to FIG. 10, a case of one macro 102 receiving ACK/NACK from (exactly) two possible LPNs 104 is described next. The heterogeneous network 1000 includes two LPNs, LPN1 and LPN2, numbered 104 and 1004, in the macrocell coverage area. The operations of uplink signal 402, downlink signal 404 and backhaul message 406 has been previously described in this document. In addition, the uplink data transmission 402 may also be received by the LPN2 1004. The LPN2 1004 is operated with its own backhaul connection 1006, over which the LPN2 1004 can send message conveying ACK or NACK of the uplink transmission 402. The backhaul connection 1006 is characterized by a transmission delay D2, which in general is different from delay D1 of the backhaul connection 406. Depending on the values D1 and D2 relative to the expected feedback delay (e.g., 3 milliseconds for LTE), the following cases are possible. In the first case, both LPNs have short delays D1 and D2 on their backhaul connection to the macro base station 102.

TABLE 3

Case1: D1, D2 < 3 ms

If ACK/NACK from LPN1 = ACK, then
    Send ACK over PHICH
    If applicable: Order New Data over PDCCH
Else if ACK/NACK from LPN1 = NACK
    Wait for ACK/NACK from LPN2
If ACK/NACK from LPN2 = ACK
    Send ACK over PHICH
    If applicable: Order New Data over PDCCH
Else if ACK/NACK from LPN2 = NACK
    Send NACK over PHICH In the second case, one of the LPNs has a small delay but the other LPN has a delay that exceeds the time interval between uplink data transmission and the corresponding HARQ signal.

TABLE 4

Case 2: D1 < 3 ms, D2 > 3 ms

If ACK/NACK from LPN1 = ACK, then
    Send ACK over PHICH
    If applicable: Order New Data over PDCCH
Else if ACK/NACK from LPN1 = NACK
    Send dummy ACK over PHICH at n+4;
    Wait for ACK/NACK from LPN2
If ACK/NACK from LPN2 = ACK
    If applicable: Order New Data over PDCCH
Else if ACK/NACK from LPN2 = NACK
    Order Retransmission over PDCCH In the third example, the backhaul delays of both LPNs exceed the 3 millisecond threshold. In some embodiments, the macro base station 102 performs PDCCH transmissions, as listed in the pseudo-code of Table 5.

TABLE 5

Case 3: 3 ms < D1, D2

Send dummy ACK over PHICH at n+4
If ACK/NACK from LPN1 = ACK, then
    If applicable: Order New Data over PDCCH
Else if ACK/NACK from LPN1 = NACK
    Wait for ACK/NACK from LPN2
If ACK/NACK from LPN2 = ACK
    If applicable: Order New Data over PDCCH
Else if ACK/NACK from LPN2 = Nack
    Order Retransmission over PDCCH As can be seen from the pseudocode listing in Table 3, Table 4 and Table 5, the macro base station 102 waits until receiving a first positive acknowledgement message (uplink transmission successfully received) from an LPN 104 or the expiration of the time period to send an acknowledgement to the UE 106. If no positive acknowledgement is received at the expiration of the time period, a dummy ACK is sent to the UE 106. After feedback from all LPNs 104 is received, either new data transmission is scheduled or a retransmission is scheduled by signaling over the PDCCH.

Multi-Node Reception of Several UEs

If the UL coverage areas of several LPNs do not overlap and UEs are located in each of the LPNs, then it is possible to schedule these UEs to transmit the PUSCH on the same RBs and to decode them separately, each at the LPN in which UL coverage region it is located.

Figure 11:
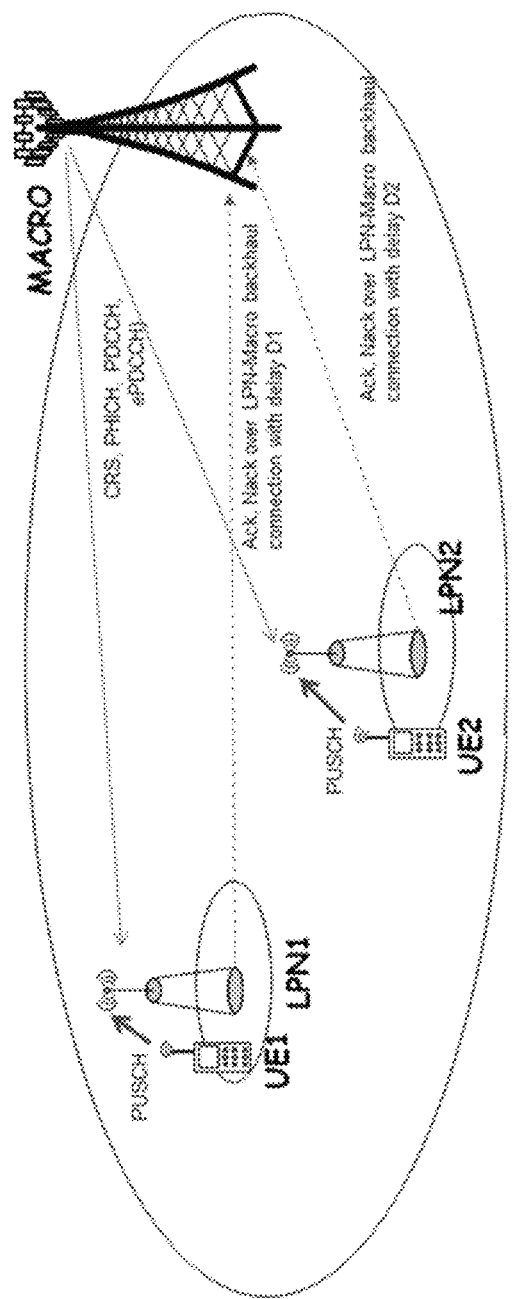
FIG. 11 depicts a heterogeneous wireless network deployment scenario which includes multiple low power nodes (LPNs).

FIG. 11 depicts an example heterogeneous network scenario 1100 in which two UEs 106 are configured to use the same transmission resources for uplink transmissions, but are configured to tall within coverage areas of two different LPNs.

This is illustrated in FIG. 11 each for two UEs, where UE1 is in the UL coverage region of LPN1 and UE2 is in the uplink coverage region of LPN2.

Each LPN sends the detected ACK/NACK to the Macro station that transmits the DL control information to the UEs.

It can be distinguished between the two cases:
    The feedback for ACK/NACK to UE1 and UE2 can be sent on separate PHICHs.

The feedback for ACK/NACK to UE1 and UE2 is to be sent with the same PHICH.

Perhaps the simplest is case number 1 when the ACK/NACK to UE1 and UE2 can be sent on separate PHICHs. Then the scenario can be considered as two independent single node receptions which has been described earlier in this disclosure.

If the feedback to the UEs has to be done on the same PHICH, the situation can occur that one NACK has to be transmitted to one UE and an ACK to the other UE. This collision causes a problem. In the example of FIG. 11, for instance, if a NACK needs to be sent to UE1 and an ACK to UE2, then, only either a NACK or an ACK to both UEs can be sent. A solution to resolve the collision is then to send an ACK from the Macro 102. For UE2, this is the true ACK but for UE1 that is a dummy ACK which just suspends the HARQ process as described earlier. The retransmission of the transport block from UE1 is then ordered using the PDCCH.

For the second case (same PHICH for all UEs), also the backhaul delay has to be taken into account

TABLE 6

Case1: D1, D2 < 3 ms

IF True ACK/NACK from LPN1 = ACK and True ACK/NACK from LPN2 = ACK
    Send ACK over PHICH at n+4;
    If applicable: Order New Data over PDCCH for UE1
    If applicable: Order New Data over PDCCH for UE2
ELSE IF True ACK/NACK from LPN1 = NACK and True ACK/NACK from LPN2 = ACK
    Send ACK over PHICH at n+4;
    Order Retransmission over PDCCH for UE1
    If applicable: Order New Data over PDCCH for UE2
ELSE IF True ACK/NACK from LPN1 = ACK and True ACK/NACK from LPN2 = NACK
    Send ACK over PHICH at n+4;
    Order Retransmission over PDCCH for UE2
    If applicable: Order New Data over PDCCH for UE1
ELSE IF True ACK/NACK from LPN1 =NACK and True ACK/NACK from LPN2 = NACK
    Send NACK over PHICH at n+4;

The case of when both delays D1 and D2 are within the expected feedback delay (3 msec for LTE) is shown in Table 7 below.

TABLE 7

Case1: D1, D2 < 3 ms

IF True ACK/NACK from LPN1 = ACK
    If applicable: Order New Data over PDCCH for UE1
ELSE IF True ACK/NACK from LPN1 = NACK
    Order Retransmission over PDCCH for UE1
IF True ACK/NACK from LPN2 = ACK
    If applicable: Order New Data over PDCCH for UE2
ELSE IF True ACK/NACK from LPN2 = NACK
    Order Retransmission over PDCCH for UE2

Figure 12:
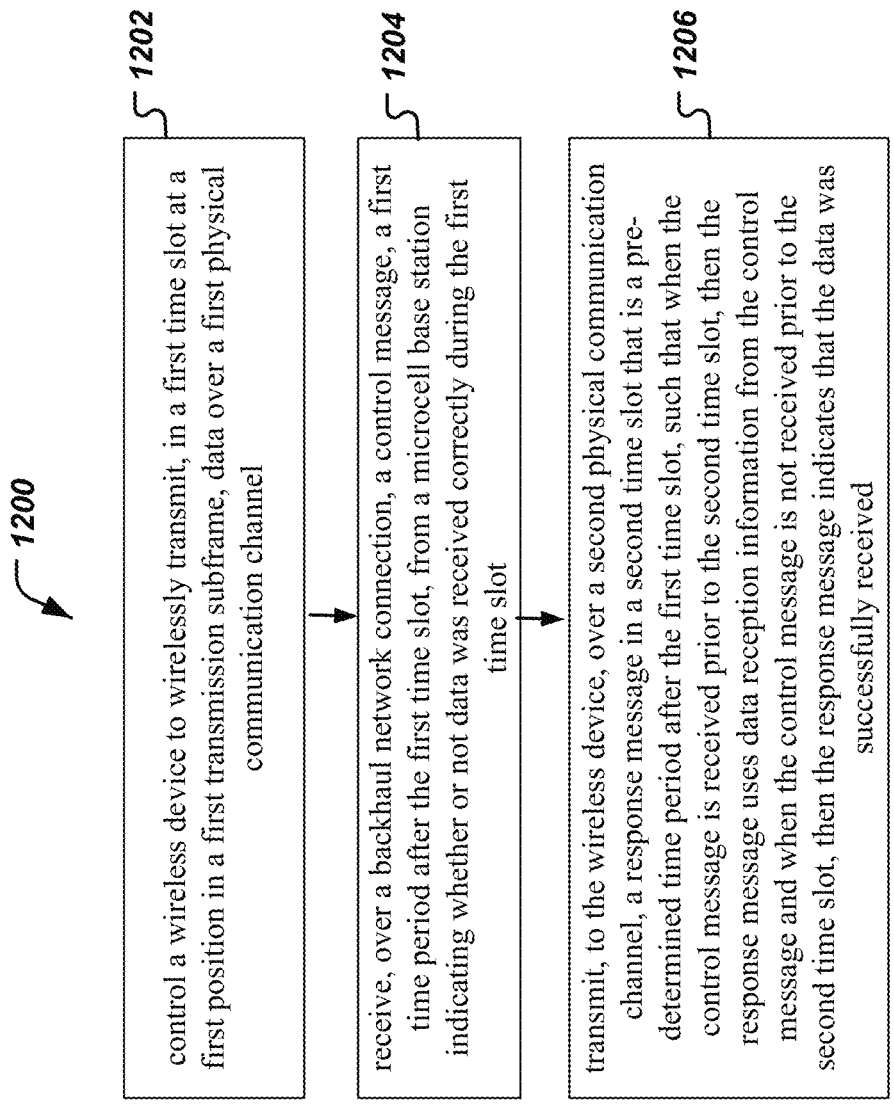
FIG. 12 is a flowchart representation of a process of wireless communications.

FIG. 12 is a flowchart representation of a process 1200 of facilitating operation of a base station in a cellular wireless communication system. At 1020, a wireless device is controlled to wirelessly transmit, in a first time slot at a first position in a first transmission subframe, data over a first physical communication channel. For example, in some implementations, the base station controls the wireless device by transmitting a schedule of resources allocated to the wireless device for uplink transmissions. As previously discussed, in some implementations, the wireless device may be assigned a fixed time slot (e.g., second time slot out of 10 time slots in a subframe of LTE) is a transmission subframe that is periodically repeated. In some implementations, the data transmission from the wireless device may be performed on a uplink physical channel. In some implementations, the uplink physical channel may be shared among multiple wireless devices.

At 1204, a control message is received over a backhaul network connection. The control message is received a first time period after the first time slot. The control message is received from a microcell base station indicating whether or not data was received correctly during the first time slot. In some implementations, the backhaul connection is, e.g., a wired connection such as a fiber optic connection (e.g., gigabit Ethernet).

At 1206, a response message is transmitted to the wireless device over a second physical communication channel. In some implementations, the second physical communication channel is the PHICH channel specified in LTE. The response message may be transmitted in a second time slot that is a pre-determined time period after the first time slot. For example, as previously discussed, the response message is transmitted at (n+4)th time slot, or some other pre-configured time slot after the uplink data transmission. In some embodiments, when the control message is received prior to the second time slot, then the response message uses data reception information from the control message (e.g., an ACK is transmitted if an ACK was received and a NACK is transmitted if a NACK was received). In some embodiments, when the control message is not received prior to the second time slot, then the response message indicates that the data was successfully received (e.g., an ACK is transmitted).

Figure 13:
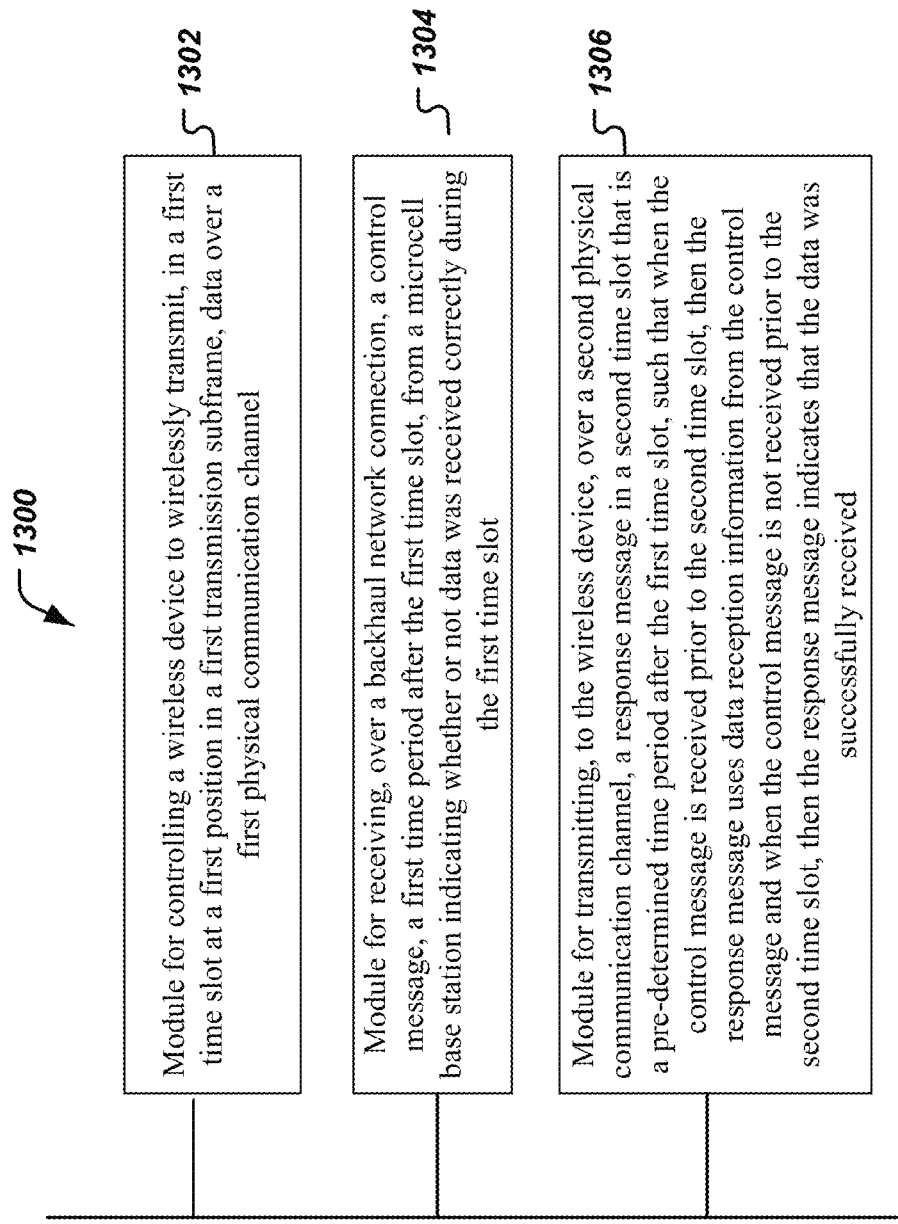
FIG. 13 is a block diagram representation of a wireless communications apparatus.

FIG. 13 is a block diagram representation of an apparatus 1300 operable in a cellular wireless communication system. The module 1302 is for controlling a wireless device to wirelessly transmit, in a first time slot at a first position in a first transmission subframe, data over a first physical communication channel. The module 1304 is for receiving, over a backhaul network connection, a control message, a first time period after the first time slot, from a microcell base station indicating whether or not data was received correctly during the first time slot. The module 1306 is for transmitting, to the wireless device, over a second physical communication channel, a response message in a second time slot that is a pre-determined time period after the first time slot, such that when the control message is received prior to the second time slot, then the response message uses data reception information from the control message and when the control message is not received prior to the second time slot, then the response message indicates that the data was successfully received.

Figure 14:
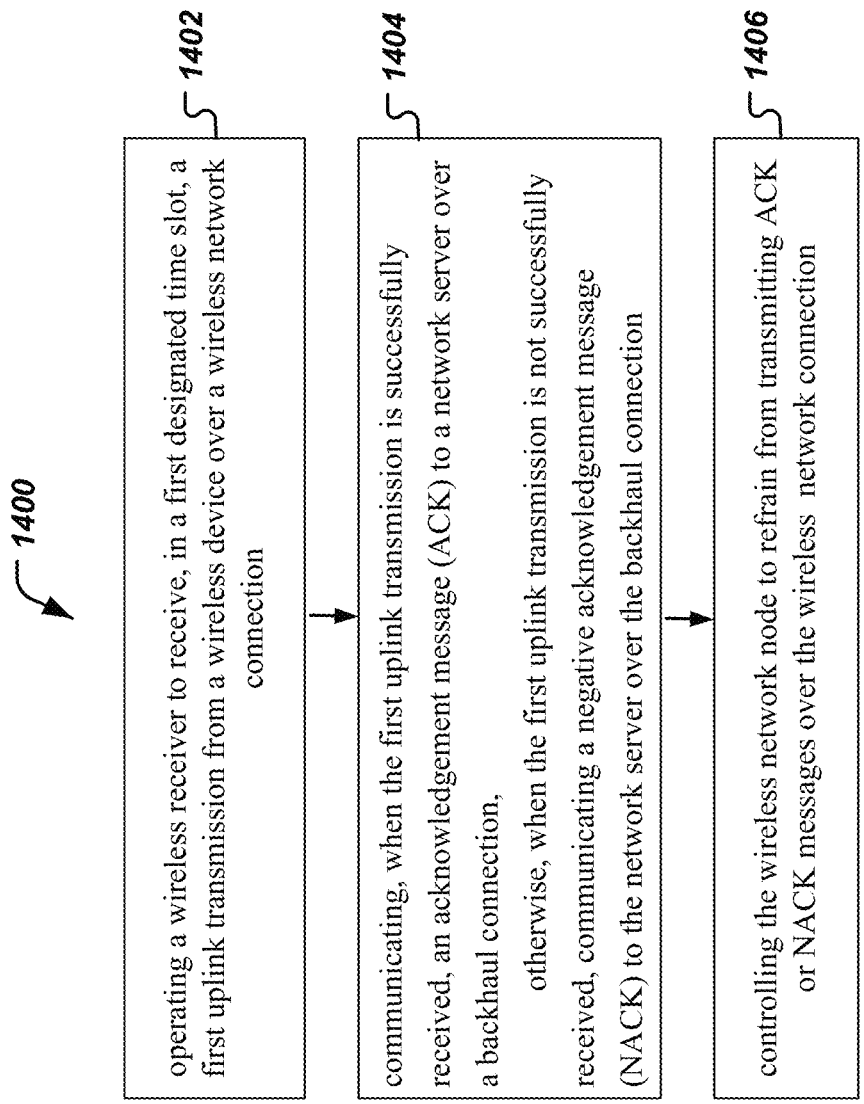
FIG. 14 is a flowchart representation of a process of wireless communications.

FIG. 14 is a flow chart representation of a process 1400 of operating a wireless network node such as a low power node or a micro cell base station. At 1402, when the first uplink transmission is successfully received, an acknowledgement message (ACK) is communicated to a network server over a backhaul connection. When the first uplink transmission is not successfully received, then a negative acknowledgement message (NACK) is communicated to the network server over the backhaul connection.

At 1404, the wireless network node t is controlled to refrain from transmitting ACK or NACK messages over the wireless network connection.

Figure 15:
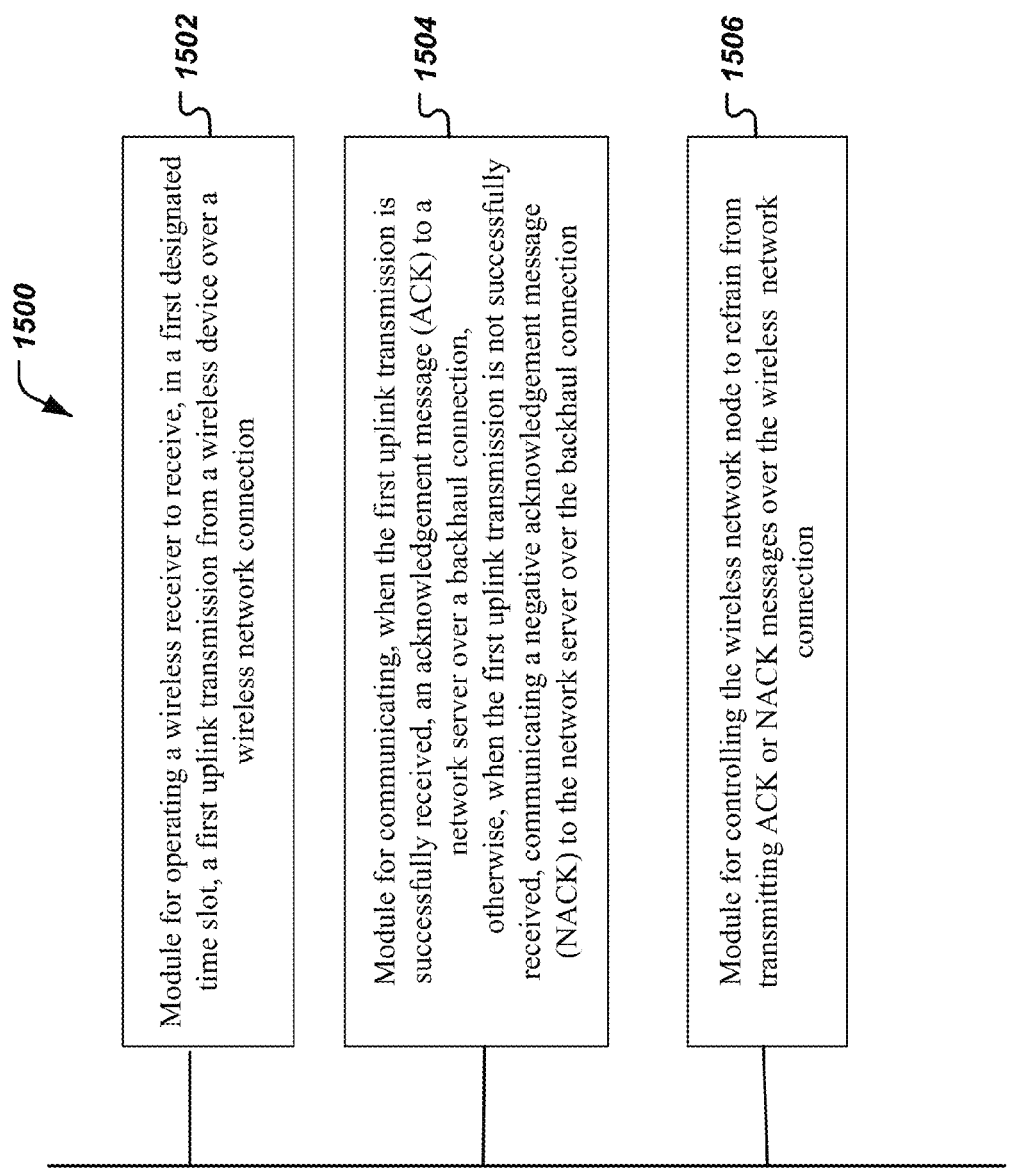
FIG. 15 is a block diagram representation of a wireless communications apparatus.

FIG. 15 is a block diagram representation of a portion of a wireless network node 1500. The module 1502 is for operating a wireless receiver to receive, in a first designated time slot, a first uplink transmission from a wireless device over a wireless network connection. The module 1504 is for communicating, when the first uplink transmission is successfully received, an acknowledgement message (ACK) to a network server over a backhaul connection, otherwise, when the first uplink transmission is not successfully received, communicating a negative acknowledgement message (NACK) to the network server over the backhaul connection. The module 1506 is for controlling the wireless network node to refrain from transmitting ACK or NACK messages over the wireless network connection.

Figure 16:
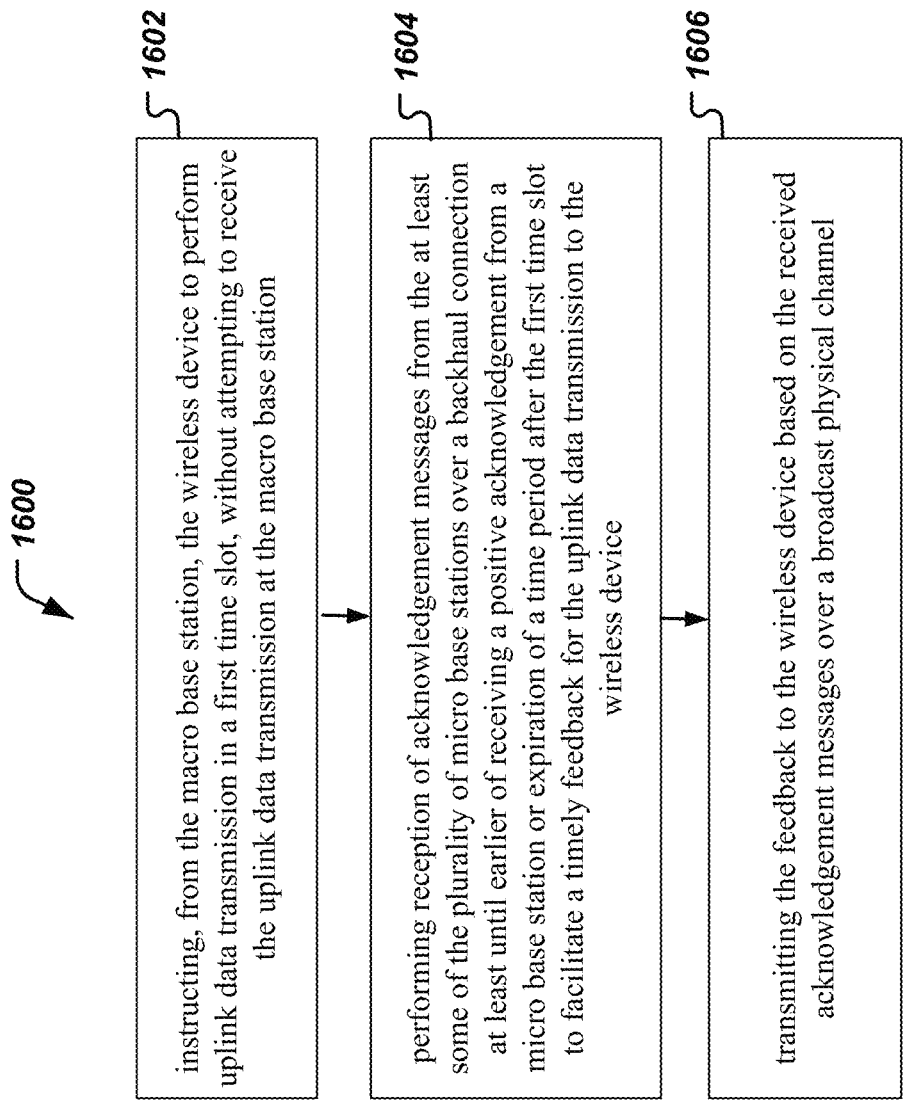
FIG. 16 is a flowchart representation of a process of wireless communications.

FIG. 16 is a flow chart representation of a process 1600 of controlling uplink data transmission operation of a wireless device in a heterogeneous wireless network comprising a macro base station and a plurality of micro base stations. At 1602, instructing, from the macro base station, the wireless device to perform uplink data transmission in a first time slot, without attempting to receive the uplink data transmission at the macro base station.

At 1604, performing reception of acknowledgement messages from the at least some of the plurality of micro base stations over a backhaul connection at least until earlier of receiving a positive acknowledgement from a micro base station or expiration of a time period after the first time slot to facilitate a timely feedback for the uplink data transmission to the wireless device.

At 1606, transmitting the feedback to the wireless device based on the received acknowledgement messages over a broadcast physical channel.

Figure 17:
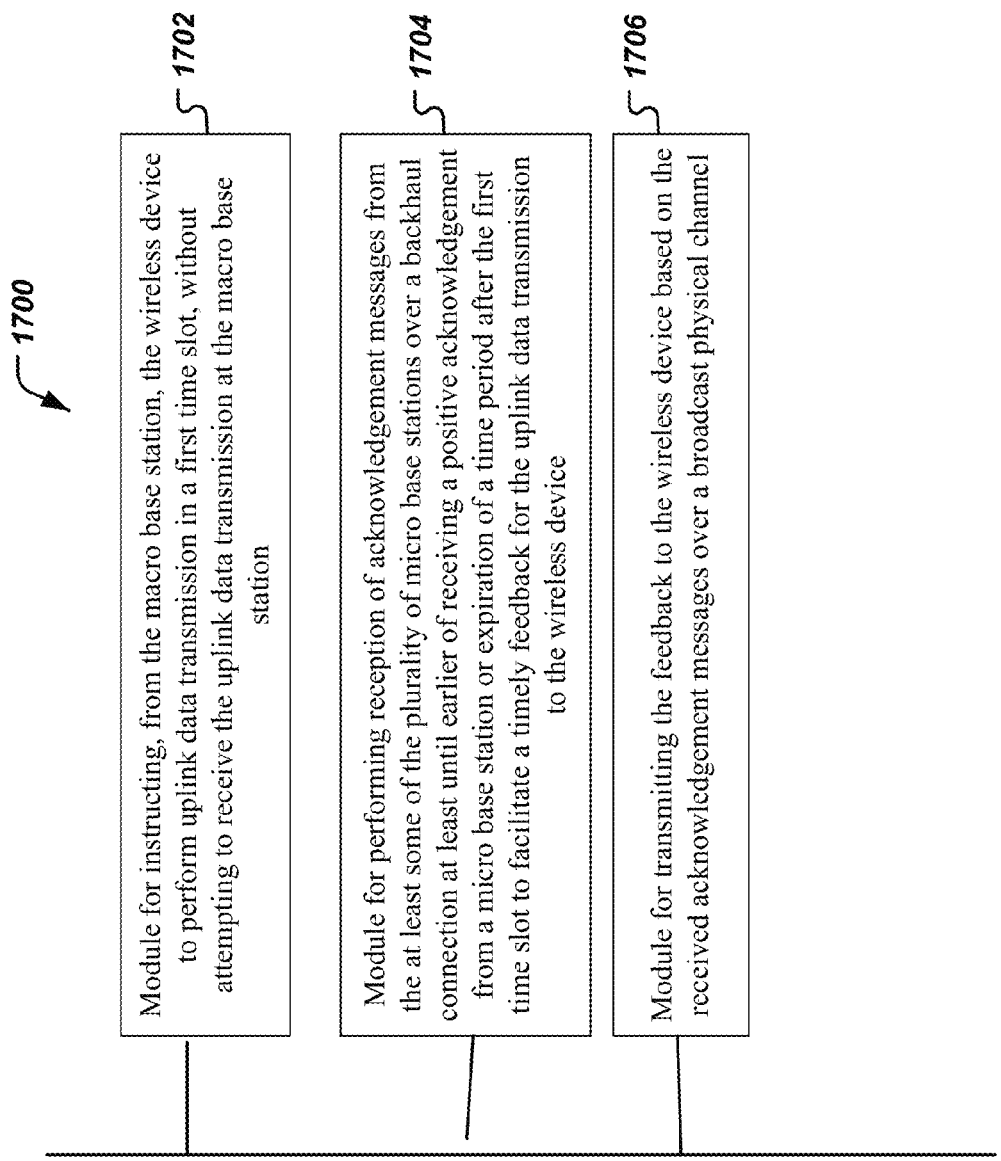
FIG. 17 is a block diagram representation of a wireless communications apparatus.

FIG. 17 is a block diagram representation of a portion of a wireless device 1700. The module 1702 is for instructing, from the macro base station, the wireless device to perform uplink data transmission in a first time slot, without attempting to receive the uplink data transmission at the macro base station. The module 1704 is for performing reception of acknowledgement messages from the at least some of the plurality of micro base stations over a backhaul connection at least until earlier of receiving a positive acknowledgement from a micro base station or expiration of a time period after the first time slot to facilitate a timely feedback for the uplink data transmission to the wireless device. The module 1706 is for transmitting the feedback to the wireless device based on the received acknowledgement messages over a broadcast physical channel.

It will be appreciated that techniques are disclosed by which an LTE UE of any 3GPP release can transmit the uplink PUSCH over the low power node. This can be done for any backhaul delay. The round trip delay of packets will become longer with increased backhaul delay but the throughput compared to transmitting the PUSCH to the Macro will in most cases be much better. Also, it is not required that the backhaul has a fixed delay. The method is designed to handle cases, where the backhaul delay changes over time and where the backhaul delay is different for different connections.

It will further be appreciated that the disclosed HetNet solutions are flexible enough to adapt easily for a wide range of backhaul delay characteristics in a real deployment.

The disclosed and other embodiments and the functional operations described in this document (e.g., an uplink transmission scheduler, a wireless transmitter, a wireless receiver, a backhaul transmitter, a controller, an uplink transmission scheduler, a backhaul receiver, a downlink transmitter, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of facilitating operation of a base station in a cellular wireless communication system, comprising:
   controlling a wireless device to wirelessly transmit, in a first time slot at a first position in a first transmission subframe, data over a first physical communication channel;
   receiving, over a backhaul network connection that is different from the first physical communication channel, a control message, a first time period after the first time slot, from a microcell base station indicating whether or not the data was received correctly during the first time slot; and
   transmitting, to the wireless device, over a second physical communication channel that is different from the first physical communication channel and the backhaul network connection, a response message in a second time slot that is a pre-determined time period after the first time slot, such that
   i) when the control message is received prior to the second time slot, then the response message includes data reception information in the received control message and
   ii) when the control message is not received prior to the second time slot, then the response message includes a dummy acknowledgement allowing the wireless device to continue operating in deterministic manner.

2. The method recited in claim 1, further comprising:
   controlling another wireless device to wirelessly transmit, when the control message is not received prior to the second time slot, in a second time slot at the first position in a second transmission subframe, data over the first physical communication channel.

3. The method recited in claim 1, wherein the first physical communication channel comprises a physical uplink channel shared by the wireless device with other wireless devices in the cellular wireless communication system.

4. A base station apparatus operable in a cellular wireless communication system, comprising:
   a uplink transmission scheduler that controls a user equipment to wirelessly transmit, in a first time slot at a first position in a first transmission subframe, data over a first physical communication channel;
   a backhaul receiver that receives, over a backhaul network connection that is different from the first physical communication channel, a control message, in a first time period after the first time slot, from a microcell base station indicating whether or not the data was received correctly during the first time slot; and a transmitter that transmits, to the wireless device, over a second physical communication channel that is different from the first physical communication channel and the backhaul network connection, a response message in a second time slot that is a pre-determined time period after the first time slot, such that
  i) when the control message is received prior to the second time slot, then the response message includes data reception information in the received control message and
  ii) when the control message is not received prior to the second time slot, then the response message includes a dummy acknowledgement allowing the wireless device to continue operating in deterministic manner.

5. The apparatus recited in claim 4, wherein the uplink transmission scheduler controls another wireless device to wirelessly transmit, when the control message is not received prior to the second time slot, in a second time slot at the first position in a second transmission subframe, data over the first physical communication channel.

6. The apparatus recited in claim 4, wherein the first physical communication channel comprises a physical uplink channel shared by the wireless device with other wireless devices in the cellular wireless communication system.

7. A method of operation of a wireless network node, comprising:
  operating a wireless receiver to receive, in a first designated time slot, a first uplink transmission from a wireless device over a wireless network connection;
  communicating, when the first uplink transmission is successfully received, an acknowledgement message (ACK) to a network server over a backhaul connection that is different from the wireless network connection,
  otherwise, when the first uplink transmission is not successfully received, communicating a negative acknowledgement message (NACK) to the network server over the backhaul connection that is different from the wireless network connection; and
  controlling the wireless network node to refrain from transmitting ACK or NACK messages over the wireless network connection.

8. The method recited in claim 7, further comprising:
  operating the wireless network node to transmit and receive wireless signals according to a schedule received from another wireless network node.

9. The method recited in claim 7, wherein the backhaul connection is comprises a wired transmission medium.

10. A wireless network apparatus, comprising:
  a wireless receiver that receives, in a first designated time slot, a first uplink transmission from a wireless device over a wireless network connection;
  a backhaul transmitter that transmits, when the first uplink transmission is successfully received, an acknowledgement message (ACK) to a network server over a backhaul connection that is different from the wireless network connection,
  otherwise, when the first uplink transmission is not successfully received, the backhaul transmitter transmits a negative acknowledgement message (NACK) to the network server over the backhaul connection that is different from the wireless network connection; and
  a controller that controls the wireless network apparatus to refrain from transmitting ACK or NACK messages over the wireless network connection.

11. The apparatus recited in claim 10, wherein the controller further operates the wireless network node to transmit and receive wireless signals according to a schedule received from another wireless network node.

12. A method of controlling uplink data transmission operation of a wireless device in a heterogeneous wireless network comprising a macro base station and a plurality of micro base stations, comprising:
  instructing, from the macro base station, the wireless device to perform uplink data transmission in a first time slot over a wireless network connection, without attempting to receive the uplink data transmission at the macro base station;
  performing reception of acknowledgement messages from at least some of the plurality of micro base stations over a backhaul connection that is different from the wireless network connection at least until earlier of receiving a positive or negative acknowledgement from a micro base station or expiration of a time period after the first time slot to facilitate a timely feedback for the uplink data transmission to the wireless device; and
  transmitting, from the macro base station, the feedback to the wireless device based on the received acknowledgement messages over a broadcast physical channel.

13. The method recited in claim 12, wherein the first time slot repetitively occurs at a fixed location in transmission subframes.

14. A macro base station for controlling uplink data transmission operation of a wireless device in a heterogeneous wireless network comprising the macro base station and a plurality of micro base stations, comprising:
  an uplink transmission scheduler that instructs the wireless device to perform uplink data transmission in a first time slot over a wireless network connection, without attempting to receive the uplink data transmission at the macro base station;
  a backhaul receiver that receives acknowledgement messages from at least some of the plurality of micro base stations over a backhaul connection that is different from the wireless network connection at least until earlier of receiving a positive or negative acknowledgement from a micro base station or expiration of a time period after the first time slot to facilitate a timely feedback for the uplink data transmission to the wireless device; and
  a downlink transmitter that transmits the feedback from the macro base station to the wireless device based on the received acknowledgement messages over a broadcast physical channel.

15. The apparatus recited in claim 14, wherein the uplink transmission scheduler further instructs the wireless device to perform new data transmissions using another physical channel.

* * * * *